United States Patent
Shim et al.

(10) Patent No.: US 9,801,009 B2
(45) Date of Patent: Oct. 24, 2017

(54) LOCATION BASED REMINDER SYSTEM AND METHOD FOR CONTROLLING THE SAME

(71) Applicant: LG Electronics Inc., Seoul (KR)

(72) Inventors: Hongjo Shim, Seoul (KR); Gukchan Lim, Seoul (KR); Seonghyok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/955,756

(22) Filed: Dec. 1, 2015

(65) Prior Publication Data

US 2016/0360344 A1    Dec. 8, 2016

(30) Foreign Application Priority Data

Jun. 4, 2015   (KR) .................... 10-2015-0079298

(51) Int. Cl.
*H04B 5/00*   (2006.01)
*H04W 4/02*   (2009.01)
(Continued)

(52) U.S. Cl.
CPC .......... *H04W 4/008* (2013.01); *G04G 21/04* (2013.01); *G06F 1/163* (2013.01); *G06F 3/0482* (2013.01); *G06F 3/04817* (2013.01); *G06F 3/04842* (2013.01); *G06F 3/04883* (2013.01); *H04L 12/2803* (2013.01); *H04M 1/7253* (2013.01); *H04M 1/72533* (2013.01); *H04M 1/72569* (2013.01); *H04M 1/72572* (2013.01)

(58) Field of Classification Search
CPC .............. H04B 7/18519; H04B 5/0031; H04B 7/0857; H04B 17/318; H04W 4/02; H04W 4/008; H04W 24/04; H04L 12/2803; G06F 3/04883; G06F 3/04842; G06F 3/0482; G06F 3/04817
See application file for complete search history.

(56) References Cited

U.S. PATENT DOCUMENTS

2005/0184852 A1 * 8/2005 Lee ..................... G05B 15/02
                                                              340/3.1
2006/0227032 A1   10/2006 Vidal
(Continued)

FOREIGN PATENT DOCUMENTS

| WO | WO 2008/091433 A1 | 7/2008 |
|----|-------------------|--------|
| WO | WO 2010/108235 A1 | 9/2010 |
| WO | WO 2013/122576 A1 | 8/2013 |

*Primary Examiner* — Andrew Wendell
(74) *Attorney, Agent, or Firm* — Birch, Stewart, Kolasch & Birch, LLP

(57) ABSTRACT

A method of controlling a mobile terminal, and which includes receiving operational status information of an external device, via a wireless communication unit of the mobile terminal, from the external device in response to the mobile terminal being located within a predetermined distance range from the external device; displaying an icon on a display of the mobile terminal representing a type of the external device; and displaying the operational status information of the external device and recommended user notification information for performing a recommended operation on the external device in response to a selection of the displayed icon.

20 Claims, 24 Drawing Sheets

(51) Int. Cl.
  *H04L 12/28* (2006.01)
  *H04W 4/00* (2009.01)
  *G04G 21/04* (2013.01)
  *G06F 1/16* (2006.01)
  *H04M 1/725* (2006.01)
  *G06F 3/0481* (2013.01)
  *G06F 3/0482* (2013.01)
  *G06F 3/0484* (2013.01)
  *G06F 3/0488* (2013.01)

(56) References Cited

U.S. PATENT DOCUMENTS

| 2014/0045463 | A1  | 2/2014  | Hsieh et al. |
| 2015/0208203 | A1* | 7/2015  | Cao ................... G06F 17/3087 455/456.3 |
| 2015/0286388 | A1* | 10/2015 | Jeon .................. G06F 3/04817 715/736 |
| 2015/0312113 | A1* | 10/2015 | Forutanpour ........... H04L 51/20 715/734 |
| 2016/0014220 | A1* | 1/2016  | Kim ................... G01C 21/3438 709/202 |
| 2016/0282129 | A1* | 9/2016  | Wang .................... H04W 4/02 |

\* cited by examiner

[POSITION 2]

[POSITION 3]

[POSITION 4]

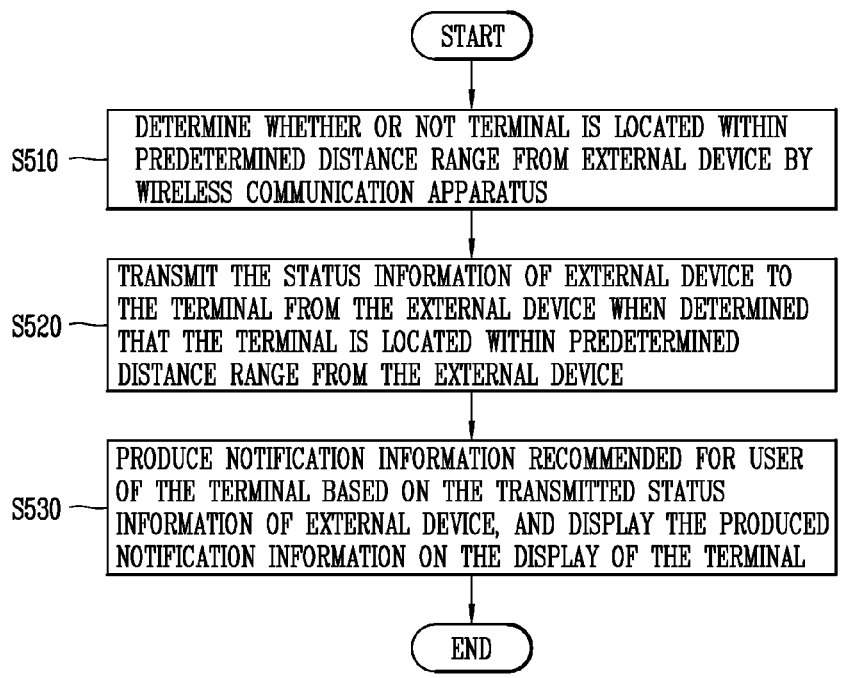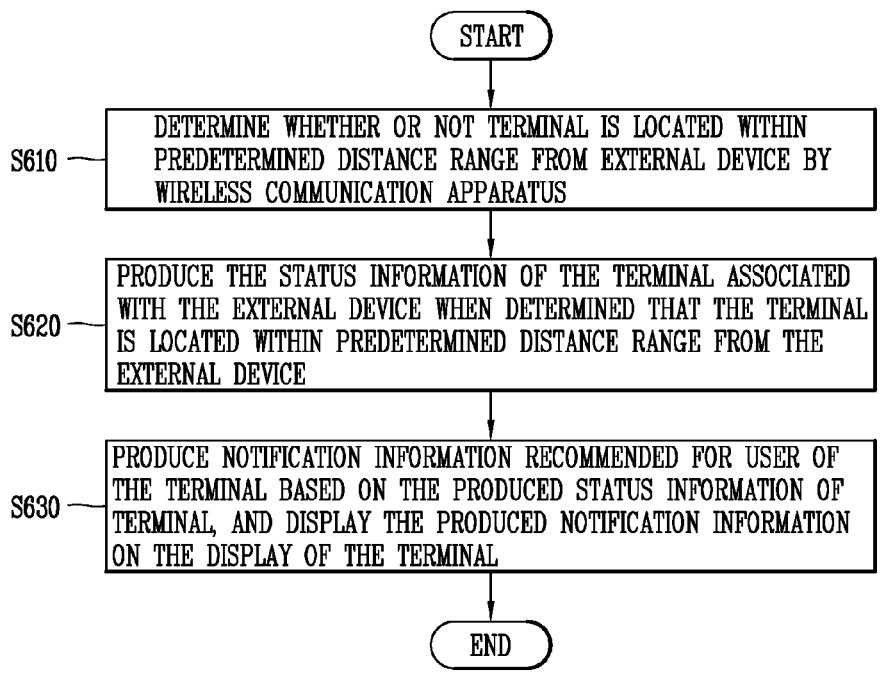

LOCATION BASED REMINDER SYSTEM AND METHOD FOR CONTROLLING THE SAME

CROSS-REFERENCE TO RELATED APPLICATIONS

This application claims the benefit of priority of Korean Patent Application No. 10-2015-0079298, filed on Jun. 4, 2015, which is herein expressly incorporated by reference in their entireties.

BACKGROUND OF THE INVENTION

1. Field of the Invention

The present disclosure relates to a location based reminder system for producing information based on the location of a terminal, and a control method thereof.

2. Description of the Related Art

Terminals may be generally classified into mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player. For such a function of the terminal, specific alarm information may be output at a time set by a user.

SUMMARY OF THE INVENTION

An aspect of the present disclosure is to solve the foregoing problem and other problems.

Another aspect of the present disclosure is to provide a location based reminder system for outputting reminder information associated with the state of a terminal or smart device when a distance between the terminal and the smart device is closer, and a control method thereof.

In order to accomplish the above and other objects, according to an aspect of the present disclosure, there is provided a control method of a location based reminder system, including (a) determining whether or not a terminal is located within a predetermined distance range from an external device having a wireless communication apparatus; (b) transmitting the status information of the external device to the terminal from the external device when the controller determines that the terminal is located within the predetermined distance range from the external device; and (c) producing notification information recommended for a user of the terminal based on the transmitted status information of the external device, and displaying the produced notification information on a display of the terminal.

According to another aspect of the present disclosure, there is provided a control method of a location based reminder system, including (a) determining whether or not a terminal is located within a predetermined distance range from an external device having a wireless communication apparatus; (b) producing the status information of the terminal associated with the external device when the controller determines that the terminal is located within the predetermined distance range from the external device; and (c) producing notification information recommended for a user of the terminal based on the produced status information of the terminal, and displaying the produced notification information on a display of the terminal.

According to still another aspect of the present disclosure, there is provided a location based reminder system, including a terminal; and an external device having a wireless communication apparatus, wherein the external device transmits the status information of the external device to the terminal when the controller determines that the terminal is located within a predetermined distance range from the external device by the wireless communication apparatus, and the terminal produces notification information recommended for the user of the terminal based on the transmitted status information of the external device, and displays the produced notification information on a display thereof.

According to yet still another aspect of the present disclosure, there is provided a location based reminder system, including a terminal; and an external device having a wireless communication apparatus, wherein the external device determines whether or not the terminal is located within a predetermined distance range from the external device by the wireless communication apparatus, and the terminal produces the status information of the terminal associated with the external device when the controller determines that the terminal is located within the predetermined distance range from the external device, and produces notification information recommended for a user of the terminal based on the produced status information of the terminal, and displays the produced notification information on a display thereof.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 is a flow chart illustrating a control method of a location based reminder system according to the present disclosure;

FIG. 6 is another flow chart illustrating a control method of a location based reminder system according to the present disclosure;

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

First, a terminal (mobile terminal) included in a location based reminder system according to the present disclosure will be described with reference to FIGS. 1A, 1B, 1C and 2.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like. However, it may be easily understood by those skilled in the art that the configuration according to the exemplary embodiments of this specification can also be applied to stationary terminals such as digital TV, desktop computers and the like, excluding a case of being applicable only to the mobile terminals.

Figure 1A:
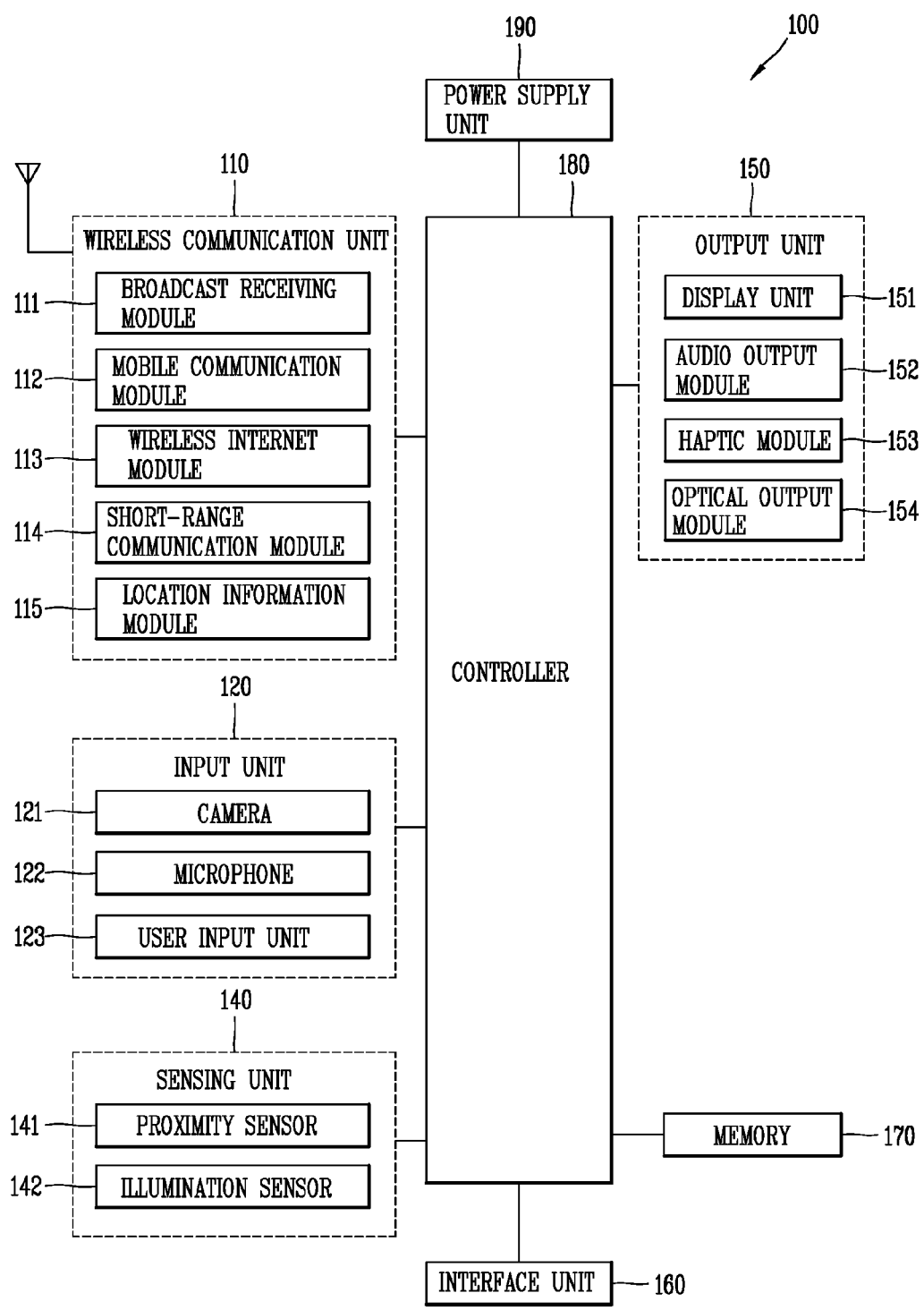
FIG. 1A is a block diagram illustrating explaining a mobile terminal associated with the present disclosure.
Figure 1B:
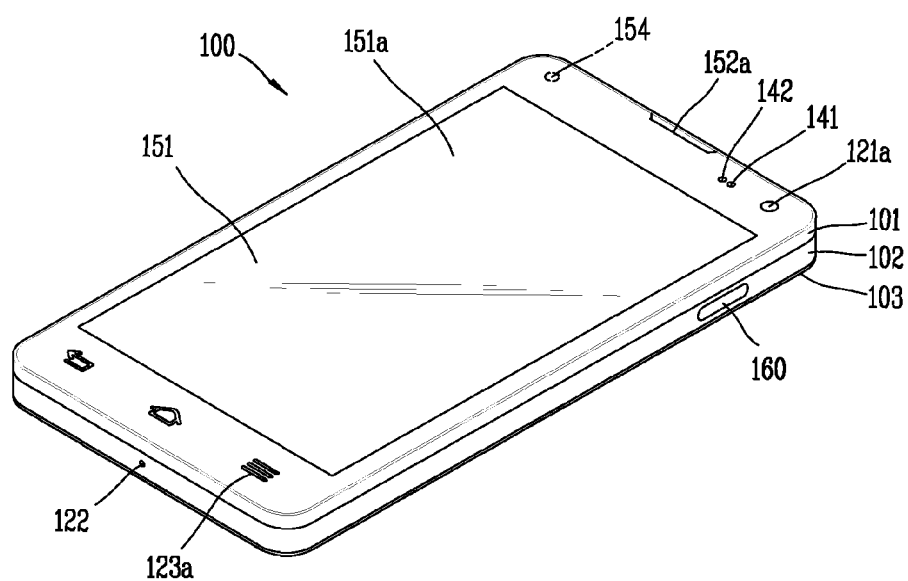
FIGS. 1B and 1C are conceptual views illustrating an example in which a mobile terminal associated with the present disclosure is seen from different directions.
Figure 1C:
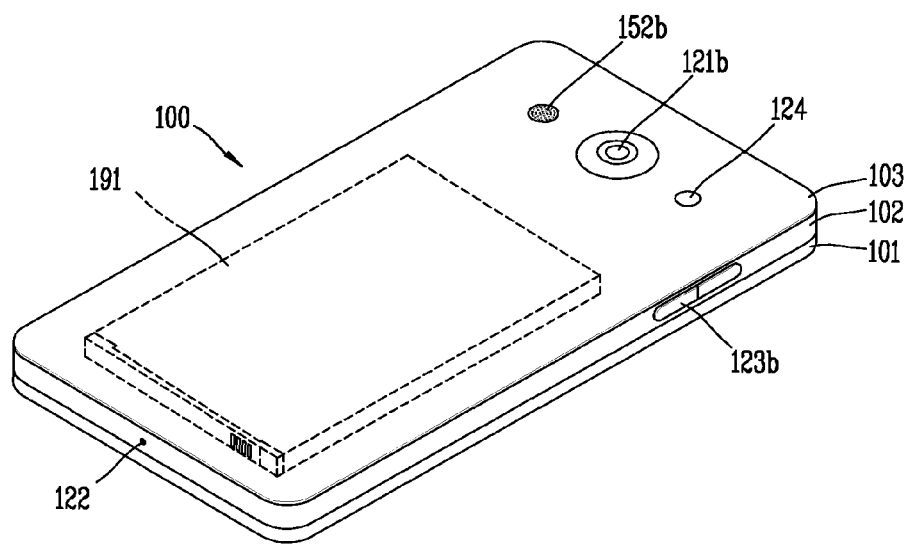

Referring to FIGS. 1A through 1C, FIG. 1A is a block diagram of a mobile terminal in accordance with the present disclosure, FIGS. 1B and 1C are conceptual views of one example of the mobile terminal, viewed from different directions. The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

For example, the wireless communication unit 110 may include at least one of a broadcast receiving module 111, a mobile communication module 112, a wireless Internet module 113, a short-range communication module 114, a location information module 115 and the like. The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). Further, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

Furthermore, the memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). Further, the application programs may be stored in the memory 170, installed in the mobile terminal 100, and executed by the controller 180 to perform an operation (or a function) of the mobile terminal 100.

The controller 180 can typically control an overall operation of the mobile terminal 100 in addition to the operations associated with the application programs. The controller 180 can provide or process information or functions appropriate for a user by processing signals, data, information and the like, which are input or output by the aforementioned components, or activating the application programs stored in the memory 170.

The controller 180 can control at least part of the components illustrated in FIG. 1, in order to drive the application programs stored in the memory 170. In addition, the controller 180 can drive the application programs by combining at least two of the components included in the mobile terminal 100 for operation. The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration. First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), etc.). The wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies. Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), Long Term Evolution (LTE), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LET and the like are executed via a mobile communication network, the wireless Internet module 113 which performs the wireless Internet access via the mobile communication network may be understood as a type of the mobile communication module 112. The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, smart glasses or a head mounted display (HMD), which can exchange data with the mobile terminal 100 (or to like data with the mobile terminal 100). The short-range communication module 114 may sense (recognize) a wearable device, which can communicate with the mobile terminal), near the mobile terminal 100. In addition, when the sensed wearable device is a device which is authenticated to communicate with the mobile terminal 100 according to the present disclosure, the controller 180 can transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wi-Fi module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 is not limited to a module for directly calculating or acquiring the location of the mobile terminal.

Next, the input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. Further, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). Further, the microphone 122 may include assorted noise removing algorithms to remove noise generated in the course of receiving the external audio signal.

The user input unit 123 may receive information input by a user. When information is input through the user input unit 123, the controller 180 can control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. Further, the virtual key or the visual key may be displayable on the touch screen in various shapes, for example, graphic, text, icon, video or a combination thereof.

The sensing unit 140 may sense at least one of internal information of the mobile terminal, surrounding environment information of the mobile terminal and user information, and generate a sensing signal corresponding to it. The controller 180 can control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this instance, the touch screen (touch sensor) may be categorized into a proximity sensor.

Hereinafter, for the sake of brief explanation, a state that the pointer is positioned to be proximate onto the touch screen without contact will be referred to as 'proximity touch,' whereas a state that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving state, etc.). Further, the controller 180 can process data (or information) corresponding to the proximity touches and the proximity touch patterns sensed by the proximity sensor 141, and output visual information corresponding to the process data on the touch screen. In addition, the controller 180 can control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like. As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180 or the controller 180 itself.

Further, the controller 180 can execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program. Further, the touch sensor may be formed to sense a touch input using a different scheme in an active or inactive state of the display unit 151. At this time, the different scheme may be associated with an active period of the touch sensor. More specifically, the touch sensor may be activated with a different period according to whether or not the display unit 151 is activated. In other words, the touch sensor may have a different active period according to whether or not the display unit 151 is activated to sense a touch input applied to the touch sensor.

For example, when the display unit 151 is in an inactive state, the touch sensor may be activated with a preset specific period. In this instance, the specific period may be a period corresponding to a time greater than zero. Furthermore, when the display unit 151 is in an active state, the touch sensor may be always operated in an active state. In other words, in this instance, an activated period of the touch sensor may be a period having a time zero or very close to zero.

Whether or not the touch sensor is activated may be determined using the power consumption of the touch sensor. For example, the touch sensor may correspond to an inactive state when the power consumption of the touch sensor is less than a preset reference value based on zero, and may be referred to as an active state when the power consumption of the touch sensor is greater than a preset reference value based on zero.

When the display unit 151 is in an active state (hereinafter, referred to as an "active mode"), the touch sensor may continuously maintain the active state, and wait form the application of a touch input to the display unit 151. On the contrary, when the display unit 151 is in an inactive state (hereinafter, referred to as a "doze mode"), the touch sensor may be activated for each a preset specific period.

Further, as reducing a specific period in which the touch sensor is activated, a speed for sensing a touch input hitting the display unit 151 may increase, but accordingly power consumed by the touch sensor may also increase. On the contrary, as increasing the period in which the touch sensor is activated, a speed for sensing a touch input hitting the display unit 151 may decrease though power consumed by the touch sensor decreases.

Accordingly, the specific period may be set to enhance the efficiency of power consumption while the sensing speed is fast enough to the extent that cannot be recognized by the user in sensing a touch input hitting the display unit 151. For example, the specific period may be set such that the touch sensor is inactive and then active 20 times (Hz) per second. Further, while the display unit 151 is in an active state, the touch sensor may be also activated, and the active period (T) in an active state may be zero or very close to zero. Otherwise, the period of the touch sensor while the touch sensor is in an active state may be shorter several times than a specific period set to activate the touch sensor while the display unit 151 is in an inactive state.

Further, when a preset touch input (for example, a first and a second touch input consecutively hitting a predetermined region within a reference period of time) is sensed by the touch sensor in a doze mode in which the display unit 151 is deactivated and the touch sensor is periodically activated, the controller 180 can switch the doze mode to an active mode in which the display unit and touch sensor are activated.

In addition, the touch sensor may be driven with a different period based on the state of the display unit 151. For example, the touch sensor may execute a doze mode when the display unit 151 is in a closed state, and execute an active mode when switching from the closed state to an open state. Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 can calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor and a laser sensor. The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may also be implemented as a stereoscopic display unit for displaying stereoscopic images. The stereoscopic display unit 152 may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like. The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like. A signal output by the optical output module 154 may be implemented so the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen. The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 can typically control the general operations of the mobile terminal 100. For example, the controller 180 can set or release a lock state for restricting a user from inputting a control command with respect to applications when a state of the mobile terminal meets a preset condition.

The controller 180 can also perform controlling and processing associated with voice calls, data communications, video calls, and the like, or perform pattern recognition processing to recognize a handwriting input or a picture drawing input performed on the touch screen as characters or images, respectively. In addition, the controller 180 can control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging. The power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable or its similar medium using, for example, software, hardware, or any combination thereof.

Referring to FIGS. 1B and 1C, the mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner. The description in association with a specific type of mobile terminal or on a specific type of mobile terminal will be also typically applied to another type of mobile terminal.

Here, the terminal body may be understood as a conception which indicates the mobile terminal 100 as at least one assembly. The mobile terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101. In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. Further, the rear cover 103 may include an opening for externally exposing a camera 121b or an audio output module 152b.

The cases 101, 102, 103 may be formed by injection-molding synthetic resin or may be formed of a metal, for example, stainless steel (STS), titanium (Ti), or the like. Unlike the example which the plurality of cases form an inner space for accommodating such various components, the mobile terminal 100 may be configured such that one case forms the inner space. In this example, a mobile terminal 100 having a uni-body formed so synthetic resin or metal extends from a side surface to a rear surface may also be implemented.

Further, the mobile terminal 100 may include a waterproofing unit for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled. The mobile terminal may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

Here, those components may not be limited to the arrangement, but be excluded or arranged on another surface if necessary. For example, the first manipulation unit 123a may not be disposed on the front surface of the terminal body, and the second audio output module 152b may be disposed on the side surface other than the rear surface of the terminal body. The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display. The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 can generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display on a rear surface of the window 151a or patterned directly on the rear surface of the window 151a. Or, the touch sensor may be integrally formed with the display. For example, the touch sensor may be disposed on a substrate of the display or within the display. The display unit 151 may form a touch screen together with the touch sensor. Here, the touch screen may serve as the user input unit 123 (see FIG. 1A). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds. The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this instance, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170. The first and second manipulation units 123a and 123b are examples of the user input unit 123, which may be manipulated by a user to input a command for controlling the operation of the mobile terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings are illustrated based on the first manipulation unit 123a is a touch key, but the present disclosure is not limited to this. For example, the first manipulation unit 123a may be configured with a mechanical key, or a combination of a touch key and a push key. The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

Further, as another example of the user input unit 123, a rear input unit may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen. Further, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds. The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a. The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject. The second audio output module 152b may further be disposed on the terminal body. The second audio output module 152b may implement stereophonic sound functions in conjunction with the first audio output module 152a (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 for supplying power to the mobile terminal 100 may be disposed on the terminal body. The power supply unit 190 may include a batter 191 which is mounted in the terminal body or detachably coupled to an outside of the terminal body. The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

Further, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Further, a mobile terminal may extend to a wearable device which is wearable on a human body, going beyond usually using the mobile terminal by a user with grabbing it with a hand. Examples of the wearable device may include a smart watch, a smart glass, a head mounted display (HMD), and so on. Hereinafter, description will be given of examples of a mobile terminal extending to the wearable device.

A wearable device may exchange data with (or cooperate with) another mobile terminal 100. The short-range communication module 114 may sense (recognize) a wearable device, which can communicate with the mobile terminal), near the mobile terminal 100. In addition, when the sensed wearable device is a device which is authenticated to communicate with the mobile terminal 100 according to the present disclosure, the controller 180 can transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

Figure 2:
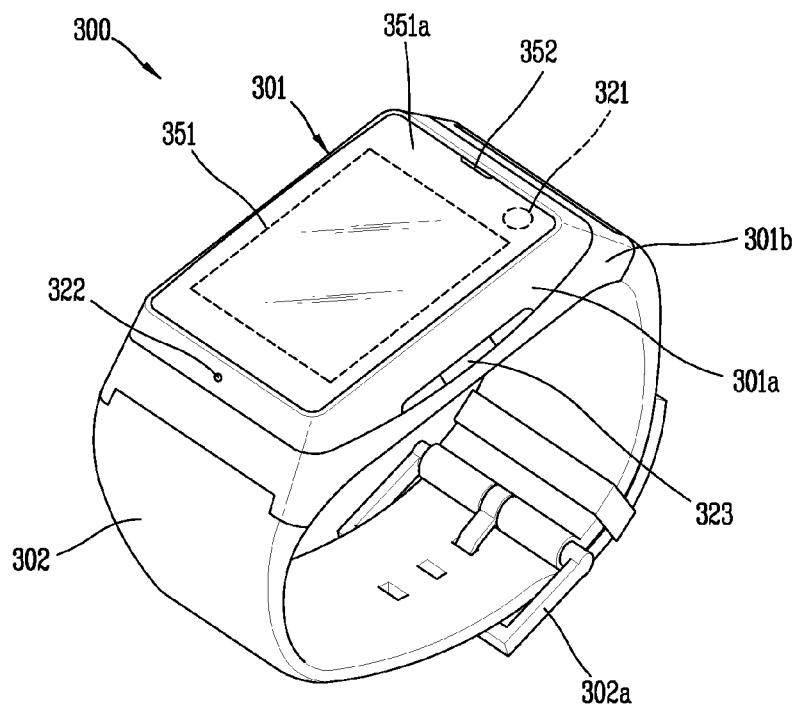
FIG. 2 is a perspective view illustrating an example of a watch-type mobile terminal associated with another embodiment of the present disclosure.

FIG. 2 is a perspective view illustrating one example of a watch type mobile terminal 300 in accordance with another exemplary embodiment. As illustrated in FIG. 2, the watch type mobile terminal 300 may include a main body 301 with a display unit 351, and a band 302 connected to the main body 301 to be wearable on a wrist. In general, the watch type mobile terminal 300 may include the features of the mobile terminal 100 in FIGS. 1A through 1C or similar features thereof.

The main body 301 may include a case defining an appearance. As illustrated, the case may include a first case 301a and a second case 301b cooperatively defining an inner space for accommodating various electronic components. However, the present disclosure may not be limited to this. One case may be configured to define the inner space, thereby implementing a mobile terminal 300 with a unibody. The watch type mobile terminal 300 may be allowed to perform wireless communication, and an antenna for the wireless communication may be installed in the main body 301. The antenna may extend its function using a case. For example, a case including a conductive material may be electrically connected to the antenna so as to extend a ground area or a radiation area.

The display unit 351 may be disposed on a front surface of the main body 301 to output information thereon. The display unit 351 may be provided with a touch sensor so as to implement a touch screen. As illustrated, a window 351a of the display unit 351 may be mounted onto the first case 301a to form a front surface of the terminal body together with the first case 301a.

An audio output module 352, a camera 321, a microphone 322, a user input unit 323 and the like may be disposed on the main body 301. When the display unit 351 is implemented as the touch screen, it may function as the user input unit 323, which may result in excluding a separate key on the main body 301. The band 302 may be worn on the wrist in a surrounding manner. The band 302 may be made of a flexible material for facilitating the wearing. As one example, the band 302 may be made of fur, rubber, silicon, synthetic resin or the like. The band 302 may also be configured to be detachable from the main body 301. Accordingly, the band 302 may be replaceable with various types of bands according to a user's preference.

Further, the band 302 may be used for extending the performance of the antenna. For example, the band may include therein a ground extending portion electrically connected to the antenna to extend a ground area. The band 302 may be provided with a fastener 302a. The fastener 302a may be implemented into a buckle type, a snap-fit hook structure, a Velcro type, or the like, and include a flexible section or material. The drawing illustrates an example that the fastener 302a is implemented into the buckle type.

Hereinafter, a communication system which is operable with the mobile terminal 100 according to the present disclosure will be described. First, such communication system utilizes different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (especially, Long Term Evolution (LTE)), Global System for Mobile Communications (GSM), and the like. By way of non-limiting example only, further description will relate to a CDMA communication system, but such teachings apply equally to other system types including a CDMA wireless communication system.

A CDMA wireless communication system includes one or more mobile terminals 100, one or more base stations (BSs), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT. Global Positioning System (GPS) satellites for locating the position of the mobile terminal 100 may cooperate with the CDMA wireless communication system. Such satellites 300 facilitate locating the position of the mobile terminal 100. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

A location information module 115 of the mobile terminal is configured to acquire a position of the mobile terminal. Such location information module 115 may include a Global Position System (GPS) module and a Wireless Fidelity (Wi-Fi) module. According to the need, the location information module 115 may perform any function of another module of the wireless communication unit 110 to obtain data for the location of the mobile terminal in a substitutional or additional manner.

The GPS module 115 may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module may acquire speed information by real time calculating a current position. It is difficult to precisely measure a position of the mobile terminal using the GPS module, in a blind spot of satellite signals such as an indoor space. In order to compensate for the positioning technique using such GPS module, a Wi-Fi Positioning System (WPS) may be utilized.

The Wi-Fi positioning system (WPS) refers to a location determination technology based on a wireless local area network (WLAN) using Wi-Fi as a technology for tracking the location of the mobile terminal 100 using a Wi-Fi module provided in the mobile terminal 100 and a wireless access point for transmitting and receiving to and from the Wi-Fi module. The Wi-Fi positioning system may include a Wi-Fi location determination server, a mobile terminal 100, a wireless access point (AP) connected to the mobile terminal, and a database stored with any wireless AP information.

The mobile terminal 100 connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may be at least one of MAC address, SSID, RSSI, channel information, privacy, network type, signal strength and noise strength. The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database. A method for extracting (analyzing) location information of the mobile terminal 100 may include a Cell-ID method, a fingerprint method, a trigonometry method, a landmark method, etc.

The Cell-ID method is used to determine a position of a wireless AP having the largest signal strength, among peripheral wireless AP information collected by a mobile terminal, as a position of the mobile terminal. The Cell-ID method is advantageous in that an implementation is simple, additional costs are not required, and location information can be rapidly acquired. However, the Cell-ID method is disadvantageous in that precision of positioning is lowered when an installation density of a wireless AP is low. The fingerprint method is used to collect signal strength information by selecting a reference position from a service area, and to track a position of a mobile terminal using the signal strength information transmitted from the mobile terminal based on the collected information. In order to use the fingerprint method, characteristics of radio signals should be pre-stored in the form of database.

The trigonometry method is used to calculate a position of a mobile terminal, based on a distance between coordinates of at least three wireless APs and the mobile terminal. In order to measure the distance between the mobile terminal and the wireless AP, signal strength may be converted into distance information, or Time of Arrival (ToA) taken for wireless signals to be transmitted may be used. The landmark method is used to measure a position of a mobile terminal using a known landmark transmitter. Besides the above methods, various algorithms may be used to extract (analyze) location information of a mobile terminal.

Such extracted location information of the mobile terminal 100 is transmitted to the mobile terminal 100 through the Wi-Fi location determination server, thereby acquiring location information of the mobile terminal 100. The mobile terminal 100 may acquire location information by being connected to at least one wireless AP. The number of wireless APs required to acquire location information of the mobile terminal 100 may be variously changed according to a wireless communication environment where the mobile terminal 100 is positioned.

As aforementioned with reference to FIG. 1A, a short-range communication technique, such as Bluetooth™, Radio Frequency Identification (RFID), Infrared Data Association (IrDA), Ultra Wideband (UWB), ZigBee and Near Field Communication (NFC), may be applicable to the mobile terminal according to an embodiment of the present invention.

An NFC module provided at the mobile terminal supports short-range wireless communication, a non-contactable type between mobile terminals, within about 10 cm. The NFC module may operate in one of a card mode, a reader mode and a P2P mode. The mobile terminal 100 may further include a security module for storing card information, in order to operate the NFC module in a card mode. The security module may be a physical medium such as UICC (Universal Integrated Circuit Card) (e.g., SIM (Subscriber Identification Module) or USIM (Universal SIM)), a secure micro SD and a sticker, or a logical medium (e.g., embedded SE (Secure Element)) embedded in the mobile terminal. SWP (Single Wire Protocol)-based data exchange may be performed between the NFC module and the security module.

When the NFC module operates in a card mode, the mobile terminal may transmit card information on a general IC card to outside. More specifically, if a mobile terminal having therein card information on a payment card (e.g, a credit card or a bus card) is made to approach to a card reader, a short-range mobile payment may be executed. Further, if a mobile terminal which stores card information on an entrance card is made to approach to an entrance card reader, an entrance approval procedure may start. A card such as a credit card, a traffic card and an entrance card may be mounted in the security module in the form of applet, and the security module may store card information on the card mounted therein. Card information of a payment card may be at least one of a card number, a remaining amount and a usage history. Card information of an entrance card may be at least one of a user's name, a user's number (e.g., undergraduate number or staff number) and an entrance history.

When the NFC module operates in a reader mode, the mobile terminal may read data from an external tag. The data received from the external tag by the mobile terminal may be coded into the NFC Data Exchange Format defined by the NFC Forum. The NFC Forum defines four record types. More specifically, the NFC Forum defines four RTDs (Record Type Definitions) such as Smart Poster, Text, URI (Uniform Resource Identifier) and General Control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

When the NFC module operates in a P2P mode, the mobile terminal may execute P2P communication with another mobile terminal. In this instance, LLCP (Logical Link Control Protocol) may be applied to the P2P communication. For the P2P communication, connection may be generated between the mobile terminal and said another mobile terminal. The connection may be categorized into a connectionless mode which ends after one packet is switched, and a connection-oriented mode in which packets are switched consecutively. For the P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is short.

Figure 3:
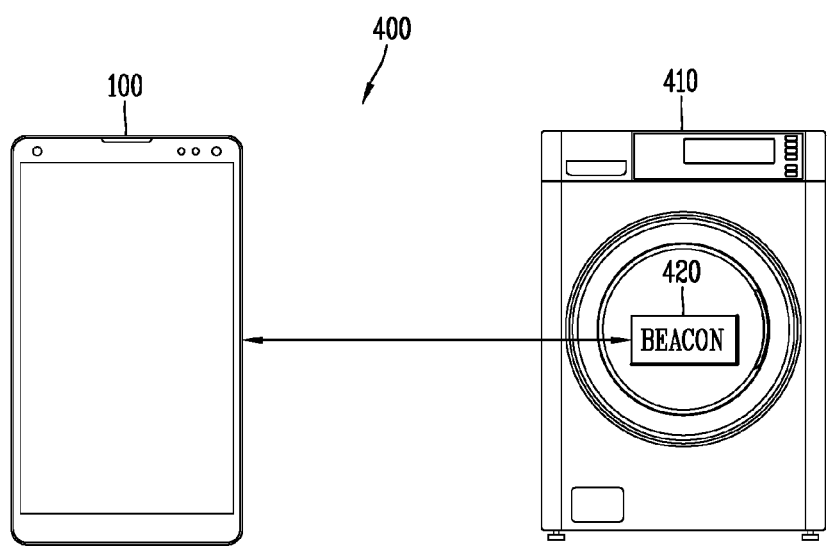
FIG. 3 is a block diagram illustrating a location based reminder system according to the present disclosure.
Figure 4A:
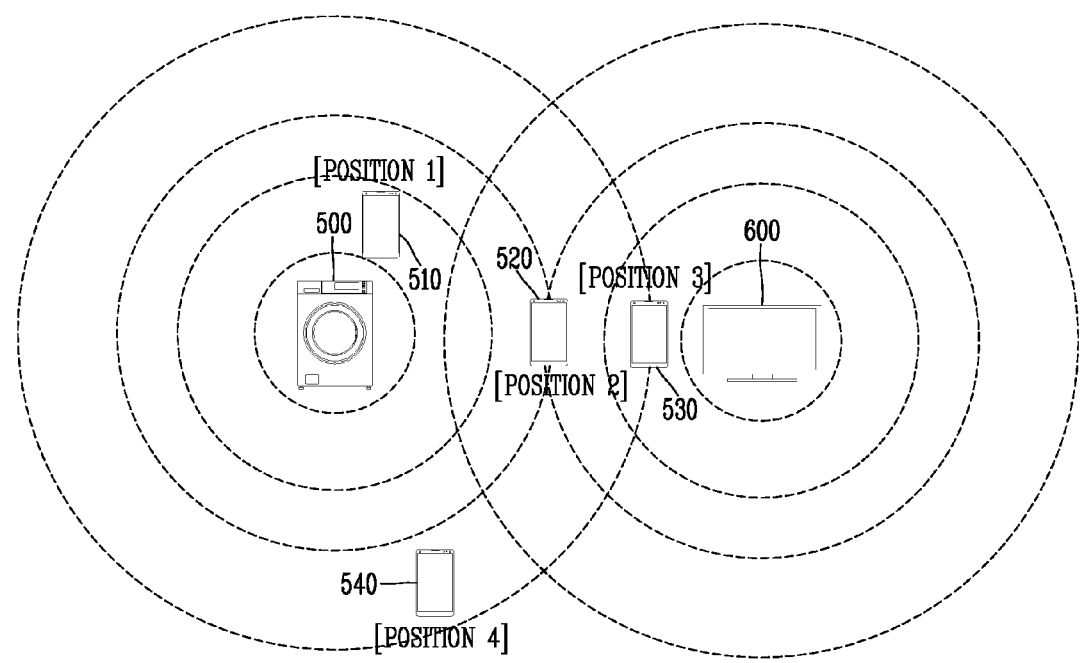
FIGS. 4A through 4E are conceptual views illustrating an embodiment of a user interface displayed according to a distance to a smart device.
Figure 4B:
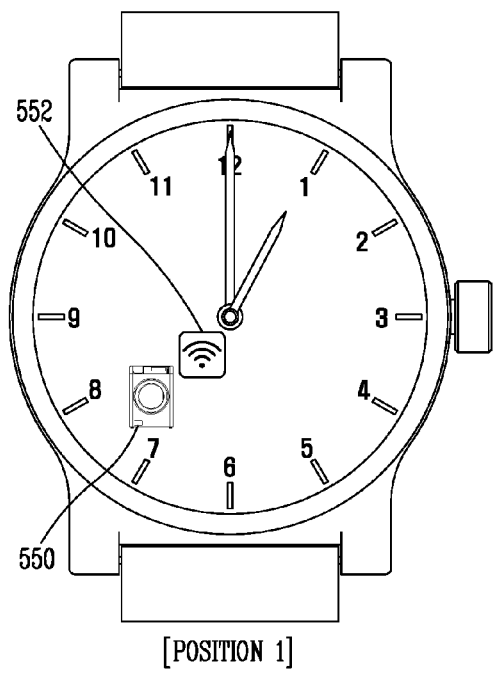
Figure 4C:
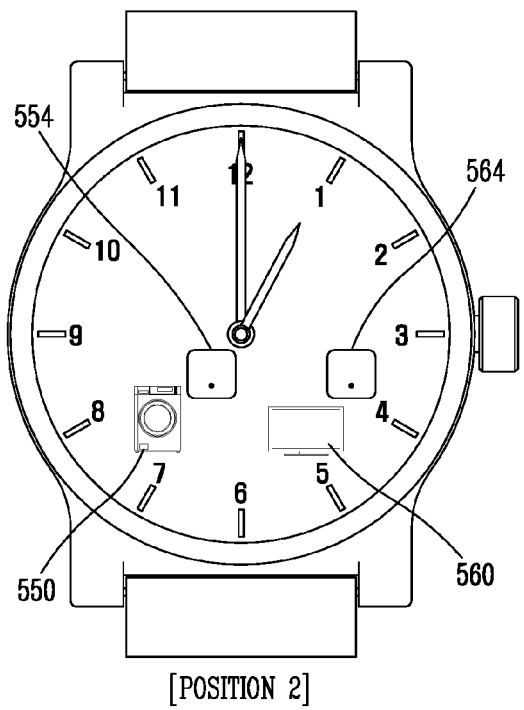
Figure 4D:
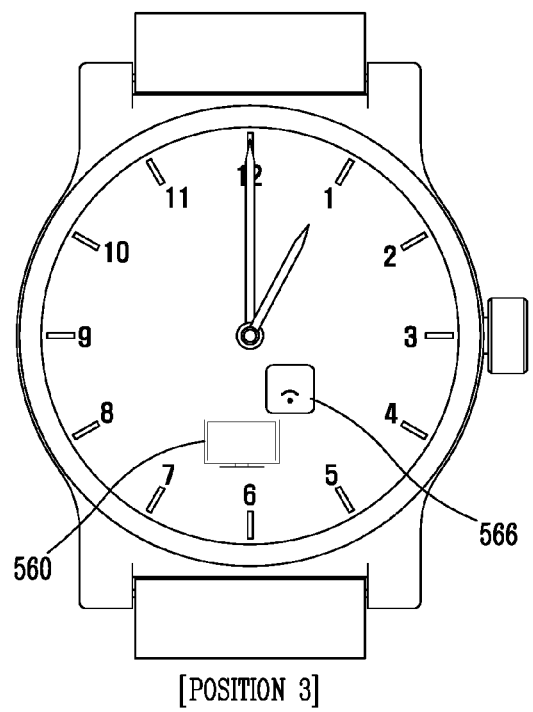
Figure 4E:
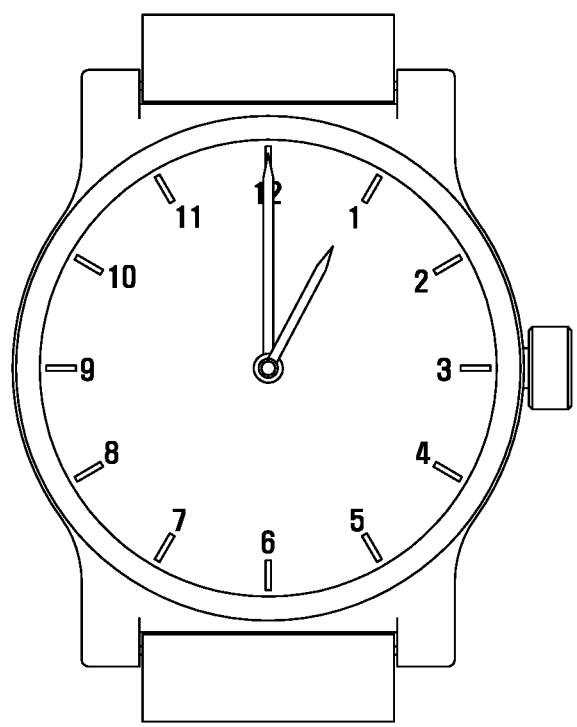

Hereinafter, the related embodiments will be described with reference to the attached drawings. It is obvious to those skilled in the art that the present features can be embodied in several forms without departing from the characteristics thereof. FIG. 3 is a block diagram illustrating a location based reminder system according to the present disclosure.

Referring to FIG. 3, the location based reminder system 400 according to the present disclosure includes a terminal 100, an external device 410 and a wireless communication apparatus 420. The wireless communication apparatus 420 may determine whether or not the terminal 100 is located within a predetermined distance range from the external device 410. In one embodiment, the wireless communication apparatus 420 may be implemented with one or more beacons.

When the controller 180 determines that the terminal 100 is located within the predetermined distance range from the external device 410, the external device 410 transmits the status information of the external device to the terminal 100. Subsequently, the terminal 100 produces notification information recommended for a user of the terminal 100 based on the transmitted status information of the external device, and displays the produced notification information on the display 151.

Here, the external device 410 may be implemented with a plurality of devices 410-1, 410-2, 410-3, . . . , 410-n capable of wireless communication. For example, a refrigerator, a washing machine, a lighting device, an audio device, a TV set, a cooking apparatus, and the like capable of wireless communication may be used. The status information of an external device denotes information for producing notification information recommended for a user of the terminal 100, and the notification information may include an operation that should be performed by the user of the terminal 100, for example.

In one embodiment associated with the location based reminder system 400 according to the present disclosure, when the controller 180 determines that the terminal 100 is located within a predetermined distance range from a smart washer 410 by a beacon 420, the smart washer 410 can transmit (the status information of the smart washer) to the terminal 100 that the laundry has been completed. Accordingly, the terminal 100 can display a message (notification information) asking whether or not to collect the laundry or perform wash again due to the completion of laundry cleaning.

In another embodiment, when that the controller 180 determines the terminal 100 is located within the predetermined distance range from the external device 410, the terminal 100 can produce the status information of the terminal 100 associated with the smart washer 410, and produce notification information recommended for a user of the terminal 100 based on the produced status information of the terminal to display the produced notification information on the display 151.

The status information of the terminal associated with an external device can denote information for producing notification information recommended for a user of the terminal 100, and the notification information may include an operation that should be performed by the user of the terminal 100.

In one embodiment associated therewith, when the controller 180 determines that the terminal 100 is located within a predetermined distance range from a smart charger 410, for example, by the beacon 420, the terminal 100 can produce information indicating whether or not battery charging is required (the status information of the terminal associated with the smart charger). Accordingly, when the controller 180 determines that battery charging is required, the terminal 100 can display notification information indicating that battery charging to the smart charger should be performed. Further, a wireless communication apparatus provided in an external device may be implemented with a beacon.

Next, FIGS. 4A through 4D are conceptual views illustrating an embodiment of a user interface displayed according to a distance to a smart device. Referring to FIG. 4, a distance to the beacon may be divided into multiple steps.

Specifically, it may be divided into when a distance to the beacon is within 0.5 m, between 0.5 m and 2 m, and above 2 m, an immediate state, a near state, a far state, respectively. Furthermore, it may be divided into when signals are not sensed (not found), an unknown state. Based on this, a different UI can be displayed according to the location of the terminal 100.

In one embodiment, when the terminal 100 is located at a first position 510, the distance is divided into an immediate state based on a washing machine 500, and an unknown state based on a TV set 600. As a result, referring to FIG. 4B, an icon 550 corresponding to the washing machine 500 may be displayed, and at this time, an icon 552 indicating that the intensity of a signal strength is strong may be displayed at the same time. Furthermore, an icon corresponding to the TV set 600 may not be displayed.

In another embodiment, when the terminal 100 is located at a second position 520, the distance is divided into both far states based on the washing machine 500 and TV set 600. As a result, referring to FIG. 4C, the icon 550 corresponding to the washing machine 500 and the icon 560 corresponding to the TV set 600 are displayed. Here, respective icons 554, 556 indicating that the intensity of a signal strength is weak may be displayed at the same time.

In still another embodiment, when the terminal 100 is located at a third position 530, the distance is divided into an unknown state based on the washing machine 500, and a near state based on the TV set 600. As a result, referring to FIG. 4D, the icon 560 corresponding to the TV set 600 can be displayed along with an icon 566 indicating that the intensity of a signal strength is a medium level. Here, the icon 550 corresponding to the washing machine 500 is not displayed.

In another embodiment, when the terminal 100 is located at a fourth position 540, the distance is divided into both unknown states based on the washing machine 500, and TV set 600. As a result, referring to FIG. 4E, both the icon 550 corresponding to the washing machine 500 and the icon 560 corresponding to the TV set 600 are not displayed.

Next, FIG. 5 is a flow chart illustrating a control method of a location based reminder system according to an embodiment of the present disclosure. Referring to FIG. 5, the controller 180 determines whether or not the terminal 100 is located within a predetermined distance range from a predetermined external device 410 by the wireless communication apparatus 420 (S510).

Subsequently, when the controller 180 determines that the terminal 100 is located within the predetermined distance range from the external device 410, the process (S520) of transmitting the status information of the external device to the terminal 100 is performed. Next, the controller 180 produces notification information recommended for a user of the terminal 100 based on the transmitted status information of the external device, and displays the produced notification information on the display 151 of the terminal 100 (S530).

In one embodiment, the controller 180 can determine whether or not the terminal 100 is located within the predetermined distance range from the external device 410 based on the intensity of a radio signal transmitted from the wireless communication apparatus 420. In another embodiment, the controller 180 can produce an operation that should be performed by a user of the terminal 100 as notification information recommended for the user of the terminal 100 based on the transmitted status information of the external device 410.

In still another embodiment, the controller 180 can produce the notification information based on a distance between the terminal 100 and the external device 410 along with the status information of the external device 410, and display the produced notification information on the display 151 of the terminal 100. In yet still another embodiment, the controller 180 can determine whether or not the terminal 100 is located within a predetermined distance range from a plurality of external devices 410-1, 410-2, 410-3, . . . , 410-n having the wireless communication apparatus 420, respectively.

Subsequently, the process S520 may include transmitting the status information of the respective external devices 410-1, 410-2, 410-3, . . . , 410-n from the respective external devices 410-1, 410-2, 410-3, . . . , 410-n to the terminal 100 when the controller 180 determines that the terminal 100 is located within the predetermined distance range from the plurality of external devices 410-1, 410-2, 410-3, . . . , 410-n, respectively. Further, the process S530 may include producing the notification information of the respective external devices 410-1, 410-2, 410-3, . . . , 410-n recommended for a user of the terminal 100 based on the transmitted status information of the respective external devices 410-1, 410-2, 410-3, . . . , 410-n.

Furthermore, the process S520 may include displaying a plurality of icons corresponding to the external devices 410-1, 410-2, 410-3, . . . , 410-n, respectively, when the controller 180 determines that the terminal 100 is located within the predetermined distance range from the plurality of external devices 410-1, 410-2, 410-3, . . . , 410-n, respectively. In an embodiment associated therewith, the process S520 may include displaying the status information of an external device corresponding to an icon to which a predetermined touch input is applied on the display 151 of the terminal 100 when the touch input is applied to one of the plurality of icons.

In another embodiment associated therewith, the process 530 may include displaying the notification information of an external device corresponding to an icon to which a predetermined touch input is applied on the display 151 of the terminal 100 when the touch input is applied to one of the plurality of icons. In still another embodiment associated therewith, the process S520 may include setting a location at which the plurality of icons are displayed on the display 151 of the terminal 100 based on the location of the terminal and the plurality of external devices 410-1, 410-2, 410-3, . . . , 410-n, respectively.

Here, the process S520 may include changing a location at which the plurality of icons are displayed on the display 151 of the terminal 100 based on a location change of the terminal 100. In another embodiment of displaying the plurality of icons, the process S520 may include setting a display status in which the plurality of icons are displayed on the display 151 of the terminal 100 based on the location of the terminal and the plurality of external devices 410-1, 410-2, 410-3, . . . , 410-n, respectively.

In still another embodiment associated therewith, the process S520 may include grouping at least one icon to which a predetermined touch input is applied to display them on the display 151 of the terminal 100 when the touch input is applied to at least one of the plurality of icons. In yet still another embodiment associated therewith, the process S520 may include grouping at least one of the plurality of icons to display them on the display 151 of the terminal 100 based on at least one of the status information and notification information of the respective external devices to display them on the display 151 of the terminal 100.

Here, the process S530 may include producing representative notification information recommended for a user of the terminal 100 based on at least one of the status information and notification information of an external device corresponding to the grouped at least one icon, and displaying the produced representative notification information for each group.

Next, FIG. 6 is another flow chart illustrating a control method of a location based reminder system according to an embodiment of the present disclosure. Referring to FIG. 6, the controller 180 determines whether or not the terminal 100 is located within a predetermined distance range from the external device 410 having the wireless communication apparatus 420 (S610). Subsequently, when the controller 180 determines that the terminal 100 is located within the predetermined distance range from the external device 410, the controller 180 produces the status information of the terminal associated with the external device 410 (S620).

Next, the controller 180 produces notification information recommended for a user of the terminal 100 based on the produced status information of the terminal, and displaying the produced notification information on the display 151 of the terminal 100 (S630). In one embodiment, the controller 180 can produce notification information recommended for a user of the terminal 100 based on the schedule information of the user stored in the terminal 100.

Further, the controller 180 can determine whether or not the terminal 100 is located within the predetermined distance range from the external device 410 based on the intensity of a radio signal transmitted from the wireless communication apparatus 420. In another embodiment, the controller 180 can produce an operation that should be performed by a user of the terminal 100 as notification information recommended for the user of the terminal 100 based on the transmitted status information of the external device 410. In still another embodiment, the controller 180 can produce the notification information based on a distance between the terminal 100 and the external device 410 along the transmitted status information of the external device 410, and display the produced notification information on the display 151 of the terminal 100.

Figure 7:
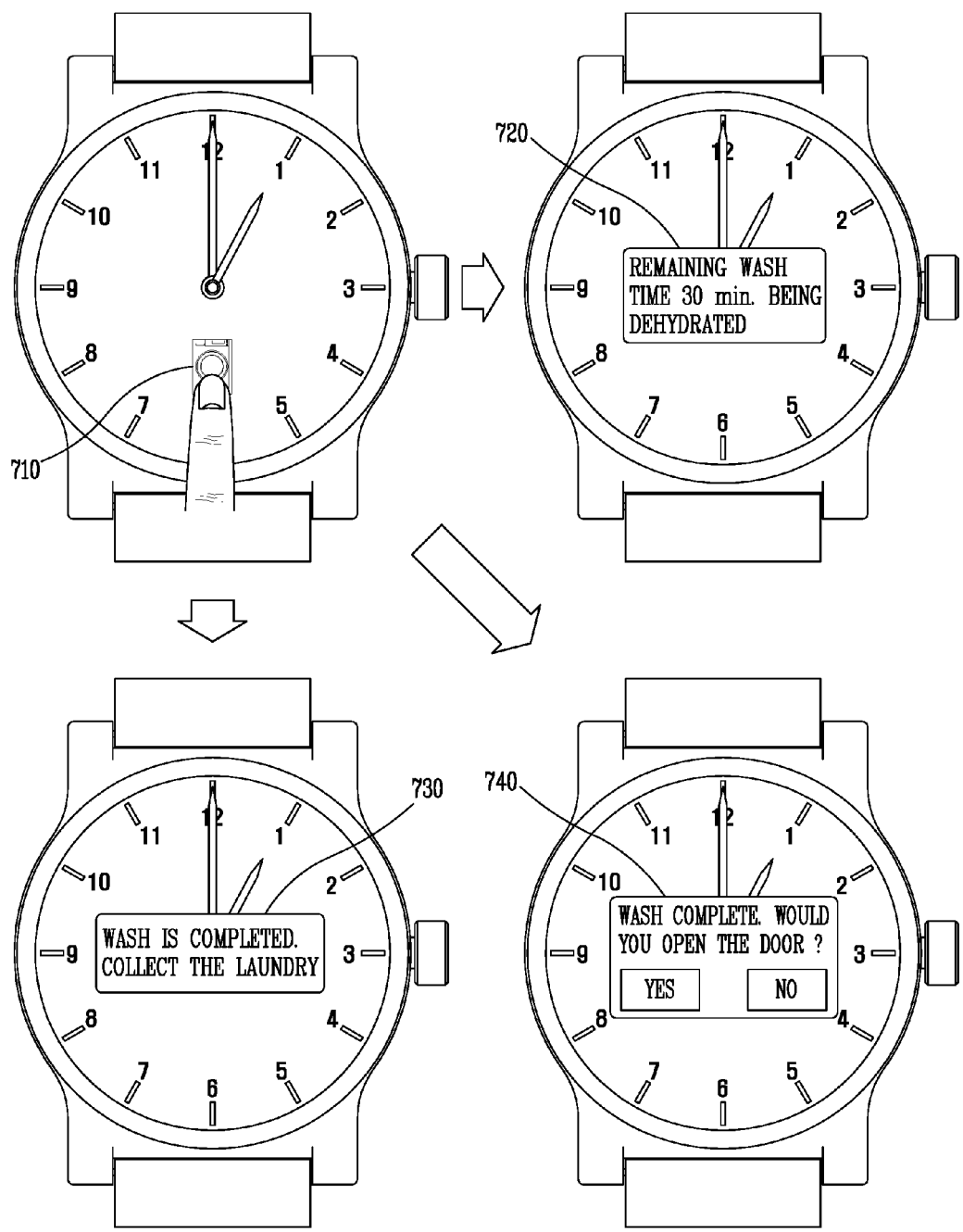
FIG. 7 is a conceptual view illustrating an embodiment in which the status information/notification information of a smart device is displayed.

As described above, the terminal 100 may be implemented as a cellular phone, a smart phone, a laptop computer, a digital broadcasting terminal, a personal digital assistant (PDA), a portable multimedia player (PMP), a navigator, a slate PC, a tablet PC, an ultra book, a wearable device (for example, a smart watch, a smart glass, a head mounted displays (HMD)), and the like. Hereinafter, an embodiment will be described for a smart phone and a smart watch, but is not limited to this. FIG. 7 is a conceptual view illustrating an embodiment in which the status information/notification information of a smart device is displayed.

Referring to FIG. 7, when the controller 180 determines that the watch type mobile terminal 300 is located within a predetermined distance range from a smart washer 410-n by the beacon 420, an icon 710 corresponding to the smart washer 410-n is displayed on the display 351. Here, the status information of the smart washer 410-n can be output as a sound notification along with the icon 710. For example, a voice message indicating that the washing machine is operating may be output.

Subsequently, when a touch input is applied to the icon 710 of the smart washer 410-n, a message window 720 including the status information of the smart washer 410-n is displayed. For example, when a wash is still being performed, the message window 720 including a remaining wash time, a currently active process (under dehydration), and the like can be displayed. In another embodiment, when a touch input is applied to the icon 710 of the smart washer 410-n, a message window 730 including the status information of the smart washer 410-n and the notification information produced therethrough is displayed. For example, when a wash is completed, the message window 730 including a message for collecting the laundry (notification information) along with a message for wash complete (status information of the smart washer) is displayed. Here, a voice message or vibration notification for collecting the laundry is displayed at the same time.

In still another embodiment, when a touch input is applied to the icon 710 of the smart washer 410-n, a message window including notification information produced through the status information of the smart washer 410-n is displayed. In other words, while status information is omitted, only notification information for collecting the laundry is displayed. In yet still another embodiment, when the controller 180 determines that the watch type mobile terminal 300 is located within a predetermined distance range from the smart washer 410-n while the process of displaying and selecting the icon 710 (touch input) is omitted, the message window 720, 730 can be immediately displayed.

In still yet another embodiment, different notification information is displayed according to a distance between the watch type mobile terminal 300 and the smart washer 410-n. Specifically, when the controller 180 determines that a distance between the watch type mobile terminal 300 and the smart washer 410-n is very close, a message window 730 including a message for collecting the laundry (notification information) along with a message of wash complete (status information of the smart washer) is displayed.

On the contrary, when the controller 180 determines that a distance between the watch type mobile terminal 300 and the smart washer 410-n is within a predetermined distance to receive the status information of the smart washer 410-n or a user of the watch type mobile terminal 300 is located at a far distance not to manipulate the smart washer 410-n, a message window 740 including a message asking whether or not to open the door of the smart washer 410-n (notification information) along with a message for wash complete (status information of the smart washer) is displayed.

In yet still another embodiment, when the controller 180 determines that a distance between the watch type mobile terminal 300 and the smart washer 410-n is within a predetermined distance to receive the status information of the smart washer 410-n or a user of the watch type mobile terminal 300 is located at a far distance not to manipulate the smart washer 410-n, a message window including a message asking whether or not to remotely control the smart washer 410-n (notification information) along with a message for a remaining wash time, a currently active process, and the like (status information of the smart washer) is displayed.

In still yet another embodiment, when the smart washer 410-n is under control, the control may continue even when a distance to the smart washer 410-n is located again out of a predetermined distance. In other words, when a control screen is continuously displayed or a new event occurs on the smart washer 410-n (for example, when a wash is completed or a rinsing step proceeds to a hydration step, and the like), the corresponding control screen is displayed.

Further, as illustrated in FIG. 5, the process S510 may include determining whether or not the terminal 100 is located within a predetermined distance range from a plurality of predetermined external devices 410-1, 410-2, 410-3, . . . , 410-n, respectively, by the wireless communication apparatus 420. Subsequently, the process S520 may include transmitting the status information of the respective external devices 410-1, 410-2, 410-3, . . . , 410-n from the respective external devices 410-1, 410-2, 410-3, . . . , 410-n to the terminal 100 when the controller 180 determines that the terminal 100 is located within the predetermined distance range from the plurality of external devices 410-1, 410-2, 410-3, . . . , 410-n, respectively.

Next, the process S530 may include producing the notification information of the respective external devices 410-1, 410-2, 410-3, . . . , 410-n recommended for a user of the terminal 100 based on the transmitted status information of the respective external devices 410-1, 410-2, 410-3, . . . , 410-n. Furthermore, the process S520 may include displaying a plurality of icons corresponding to the plurality of external devices 410-1, 410-2, 410-3, . . . , 410-n, respectively, on the display 151 of the terminal 100 when the controller 180 determines that the terminal 100 is located within the predetermined distance range from the plurality of external devices 410-1, 410-2, 410-3, . . . , 410-n, respectively.

According to an embodiment associated therewith, the process S520 may include displaying the status information of an external device corresponding to an icon to which a predetermined touch input is applied on the display 151 of the terminal 100 when the touch input is applied to one of the plurality of icons. According to another embodiment associated therewith, the process S530 may include displaying the notification information of an external device corresponding to an icon to which a predetermined touch input is applied on the display 151 of the terminal 100 when the touch input is applied to one of the plurality of icons.

Figure 8:
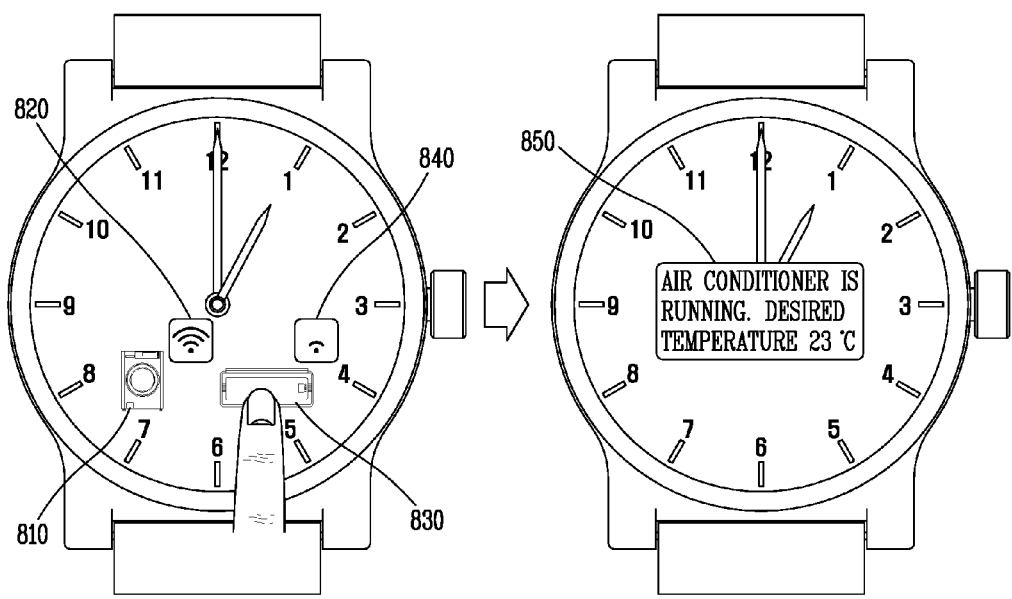
FIG. 8 is a conceptual view illustrating an embodiment in which status information is displayed when a plurality of smart devices are sensed.

FIG. 8 is a conceptual view illustrating an embodiment in which status information is displayed when a plurality of smart devices are sensed. Referring to FIG. 8, when the controller 180 determines that the watch type mobile terminal 300 is located within a predetermined distance range from a smart washer 410-1 by the beacon 420, an icon 810 corresponding to the smart washer 410-1 is displayed on the display 351.

Furthermore, when the controller 180 determines that that the watch type mobile terminal 300 is located within a predetermined distance range from a smart air conditioner 410-2, an icon 830 corresponding to the smart air conditioner 410-2 is displayed on the display 351. In one embodiment, a distance range in which the icon 810, 830 is displayed may be set in various ways for each external device. Specifically, a distance for displaying the icon 810 corresponding to the smart washer 410-1 may be set to be closer than that for displaying the icon 830 corresponding to the smart air conditioner 410-2.

At this time, an icon 820 indicating a signal intensity from the smart washer 410-1 and an icon 840 indicating a signal intensity from the smart air conditioner 410-2 is displayed along with the respective icons 810, 830. In another embodiment, icons 810, 830 corresponding to the smart washer 410-1 and smart air conditioner 410-2 is displayed in different ways according to the signal intensity.

Specifically, when a signal intensity from the smart washer 410-1 is larger than that from the smart air conditioner 410-2, the icon 810 corresponding to the smart washer 410-1 is displayed to be larger or clearer than the icon 830 corresponding to the smart air conditioner 410-2. Otherwise, the icon 810 corresponding to the smart washer 410-1 having a larger signal intensity is displayed in a highlighted manner with a different color, a blinking effect or the like. Subsequently, when a touch input is applied to the icon 830 corresponding to the smart air conditioner 410-2, a message window 850 including the status information of the smart air conditioner 410-2 is displayed. For example, a message window 850 including status information indicating that the smart air conditioner 410-2 is under operation is displayed.

In still another embodiment, when the controller 180 determines that the watch type mobile terminal 300 is located within a predetermined distance range from the smart washer 410-1 and smart air conditioner 410-2 while the process of displaying and selecting the icons 810, 830 (touch input) is omitted, a message window including status information may be immediately displayed. In an embodiment associated therewith, a distance range for displaying a message window may be set in different ways for the smart washer 410-1 and smart air conditioner 410-2.

Furthermore, the message window may include status information on at least one of the smart washer 410-1 and smart air conditioner 410-2. In one embodiment, the window may include status information chosen according to whether or not status information on an external device chosen to be displayed as a representative is included or first generated, whether or not preferentially notify the user, and the like.

Specifically, when the smart washer 410-1 is in a wash cycle, and a current temperature is in a condition that requires cooling but the smart air conditioner 410-2 is not under operation, the status information of the smart air conditioner 410-2 (or notification information for recommending the operation) may be first displayed. In another embodiment, the status information of the smart washer 410-1 and smart air conditioner 410-2 is displayed at the same time.

Figure 9:
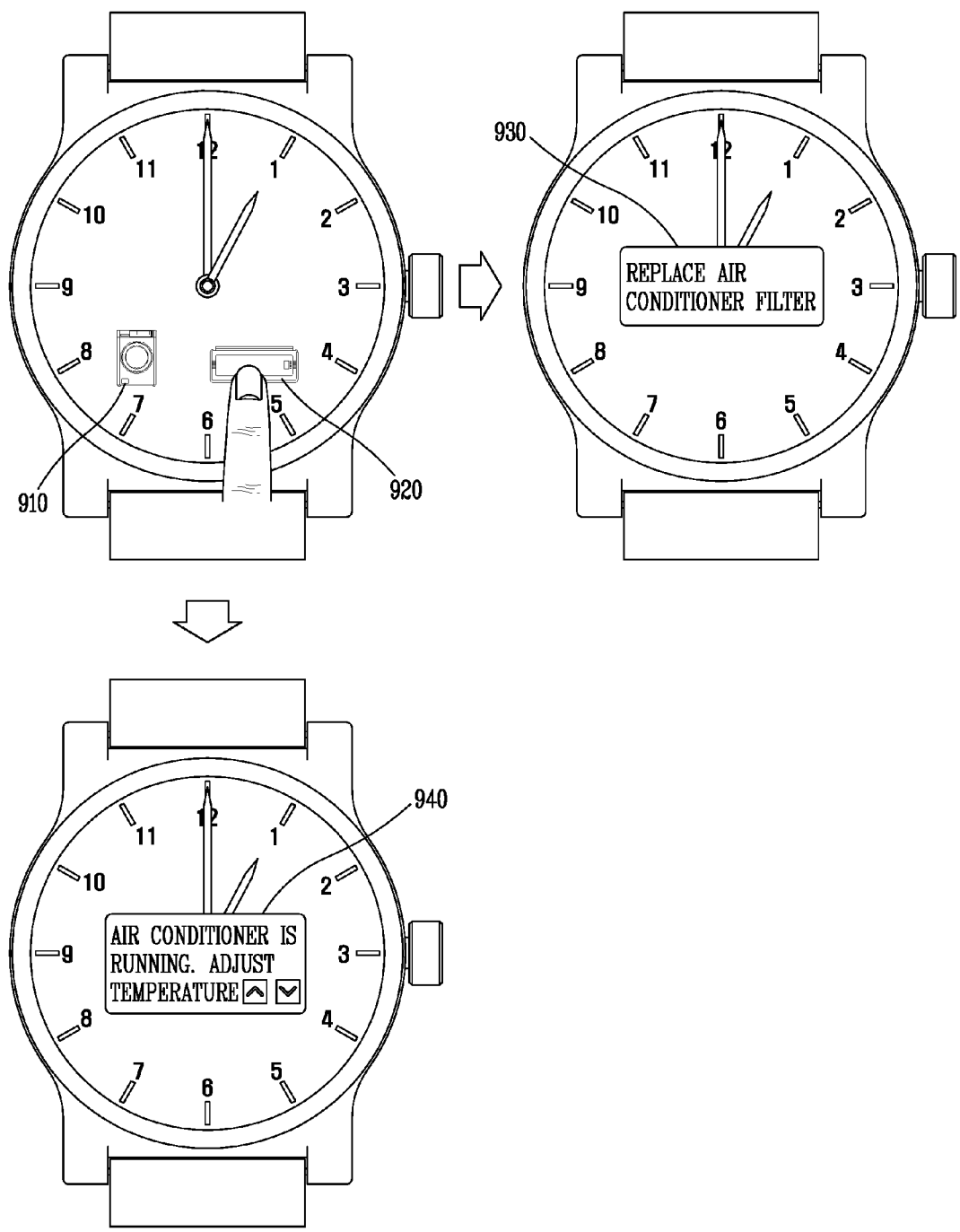
FIG. 9 is a conceptual view illustrating an embodiment in which notification information is displayed when a plurality of smart devices are sensed.

FIG. 9 is a conceptual view illustrating an embodiment in which notification information is displayed when a plurality of smart devices are sensed. Referring to FIG. 9, when the controller 180 determines that the watch type mobile terminal 300 is located within a predetermined distance range from the smart washer 410-1 by the beacon 420, an icon 910 corresponding to the smart washer 410-1 is displayed on the display 351.

Furthermore, when the controller 180 determines that the watch type mobile terminal 300 is located within a predetermined distance range from the smart air conditioner 410-2 by the beacon 420, an icon 920 corresponding to the smart air conditioner 410-2 is displayed on the display 351. In one embodiment, a distance range in which the icon 810, 830 is displayed may be set in a different ways for each external device. Specifically, a distance for displaying the icon 810 corresponding to the smart washer 410-1 may be set to be closer than that for displaying the icon 830 corresponding to the smart air conditioner 410-2.

Subsequently, when a touch input is applied to the icon 920 corresponding to the smart air conditioner 410-2, a message window 930 including the notification information of the smart air conditioner 410-2 is displayed. For example, a message window 930 including notification information asking to exchange a filter of the smart air conditioner 410-2 is displayed.

In another embodiment, when a touch input is applied to the icon 920 corresponding to the smart air conditioner 410-2, a message window 940 including the status information and notification information of the smart air conditioner 410-2 is displayed. For example, the message window 940 indicating that the smart air conditioner 410-2 is currently under operation and including an icon for temperature setting is displayed.

In still another embodiment, when the controller 180 determines that the watch type mobile terminal 300 is located within a predetermined distance range from the smart washer 410-1 and smart air conditioner 410-2 while the process of displaying and selecting the icons 910, 920 (touch input) is omitted, a message window including notification information may be immediately displayed.

In an embodiment associated therewith, a distance range for displaying a message window may be set in different ways for the smart washer 410-1 and smart air conditioner 410-2. Furthermore, the message window may include notification information on at least one of the smart washer 410-1 and smart air conditioner 410-2. In one embodiment, the window may include notification information chosen according to whether or not status information on an external device chosen to be displayed as a representative is included or first generated, whether or not preferentially notify the user, and the like.

Specifically, when the smart washer 410-1 is in a wash cycle, and a current temperature is in a condition that requires cooling but the smart air conditioner 410-2 is not under operation, notification information for recommending the operation of the smart air conditioner 410-2 may be first displayed. In another embodiment, the notification information of the smart washer 410-1 and smart air conditioner 410-2 is displayed at the same time.

In another embodiment associated with a different smart device, when a user (user of the terminal) is located within a predetermined distance range from a smart lighting device 410, notification information for exchanging a light bulb of the smart lighting device is displayed. In still another embodiment, when a user (user of the terminal) is located within a predetermined distance range from a smart cooking apparatus 410, notification information for taking out cooked foods from the smart cooking apparatus is displayed.

Referring to the embodiments of FIGS. 7 through 9, the status information and notification information of an external device may be individually or simultaneously displayed. In yet still another embodiment, notification information is displayed after a predetermined period of time has passed subsequent to displaying the status information. In yet still another embodiment, the displayed information may vary according to the touch mode. Specifically, the status information of an external device is displayed when a long touch input is applied to an icon corresponding to the external device, and the notification information of the external device is displayed when a short touch input is applied to an icon corresponding to the external device.

Further, as illustrated in FIG. 5, the process S520 may include setting a location at which the plurality of icons are displayed on the display 151 of the terminal 100 based on the location of the terminal and the plurality of external devices 410-1, 410-2, 410-3, . . . , 410-n, respectively. Here, the process S520 may include changing a location at which the plurality of icons are displayed on the display 151 of the terminal 100 based on a location change of the terminal 100. In another embodiment of displaying the plurality of icons, the process S520 may include setting a display status in which the plurality of icons are displayed on the display 151 of the terminal 100 based on the location of the terminal and the plurality of external devices 410-1, 410-2, 410-3, . . . , 410-n, respectively.

Figure 10:
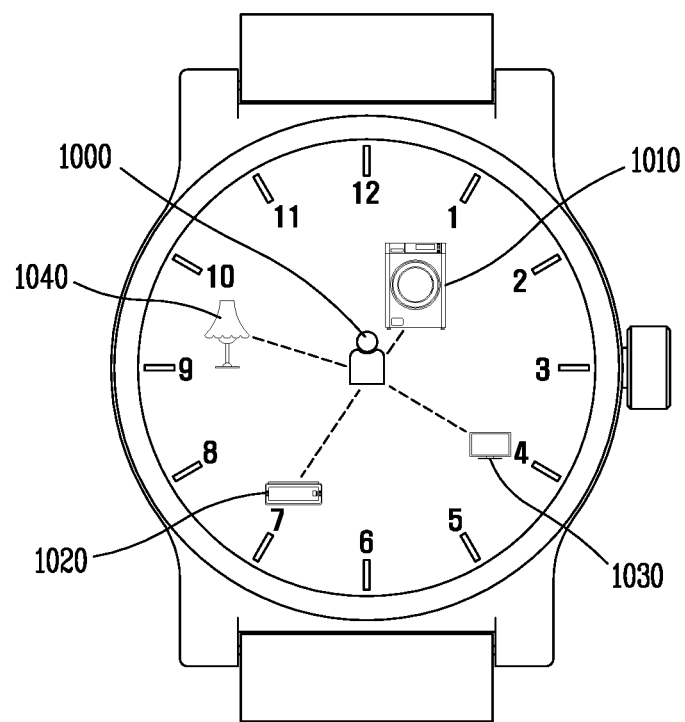
FIG. 10 is a conceptual view illustrating an embodiment in which icons corresponding to a plurality of smart devices is displayed.

FIG. 10 is a conceptual view illustrating an embodiment in which icons corresponding to a plurality of smart devices are displayed. Referring to FIG. 10, when the controller 180 determines that the watch type mobile terminal 300 is located within a predetermined distance range from the smart washer 410-1, smart air conditioner 410-2, smart TV 410-3 and smart lighting device 410-4, respectively, by the beacon 420, icons 1010, 1020, 1030, 1040 corresponding to the respective external devices 410-1, 410-2, 410-3, 410-4 is displayed.

Here, the icons 1010, 1020, 1030, 1040 are displayed at a relative direction and location with respect to an icon 1000 corresponding to the user of the watch type mobile terminal 300. Specifically, the icon 1000 corresponding to the user of the watch type mobile terminal 300 is displayed at the center of the display 351. Furthermore, when the smart washer 410-1 is located in a direction of 1 o'clock, and the smart air conditioner 410-2 is a direction of 7 o'clock, and the smart TV 410-3 is located in a direction of 4 o'clock, and the smart lighting device 410-4 is located in a direction between 9 and 10 o'clock, the icons 1010, 1020, 1030, 1040 is displayed in the respective time directions.

Furthermore, the icons 1010, 1020, 1030, 1040 is displayed in different sizes according to a distance to the watch type mobile terminal 300 and the respective external devices 410-1, 410-2, 410-3, 410-4. In one embodiment, an icon 1010 corresponding to the smart washer 410-1 located at the closest distance to the watch type mobile terminal 300 is displayed in the largest size. In another embodiment, an icon according to a smart device is displayed in a region corresponding to a remaining time until the completion of the operation of the smart device. Specifically, when 30 minutes remains until the completion of wash cycle, an icon of the smart washer is displayed in a minute hand region indicating 30 minutes.

Figure 11A:
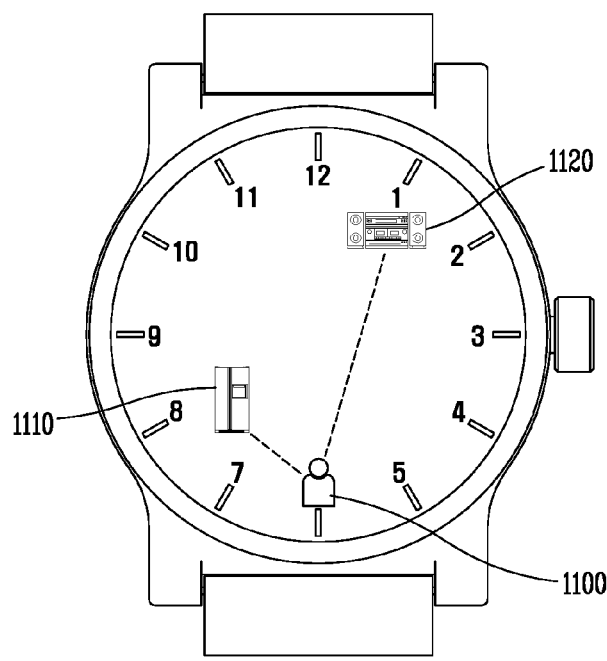
FIGS. 11A through 11D are conceptual views illustrating an embodiment in which the display of icons corresponding to a plurality of smart devices is changed according to the movement of a terminal.

FIGS. 11A through 11D are conceptual views illustrating an embodiment in which the display of icons corresponding to a plurality of smart devices is changed according to the movement of a terminal. Referring to FIG. 11A, when the controller 180 determines that the watch type mobile terminal 300 is located within a predetermined distance range from the smart refrigerator 410-1 and smart audio 410-2 by the beacon 420, icons 1110, 1120 corresponding to the respective external devices 410-1, 410-2 are displayed.

Here, the icons 1110, 1120 are displayed at a relative direction and location with respect to an icon 1100 corresponding to the user of the watch type mobile terminal 300. Specifically, the icon 1100 corresponding to the user of the watch type mobile terminal 300 is displayed at a lower end of the display 351. Furthermore, when the smart refrigerator 410-1 is on the left side, and the smart audio 410-2 is on the right side with respect to the watch type mobile terminal 300, the icons 1110, 1120 are displayed in the respective directions.

Furthermore, the icons 1110, 1120 are displayed in different sizes according to a distance to the watch type mobile terminal 300 and the respective external devices 410-1, 410-2. In one embodiment, an icon 1110 corresponding to the smart refrigerator 410-1 located at a close distance to the watch type mobile terminal 300 is displayed in a larger size.

Hereinafter, an embodiment of a user interface displayed on the display 351 when a user wearing the watch type mobile terminal 300 moves and is located in proximity to the smart audio 410-2 will be described. Hereinafter, FIGS. 11B through 11D correspond to embodiments following FIG. 11A, respectively.

Figure 11B:
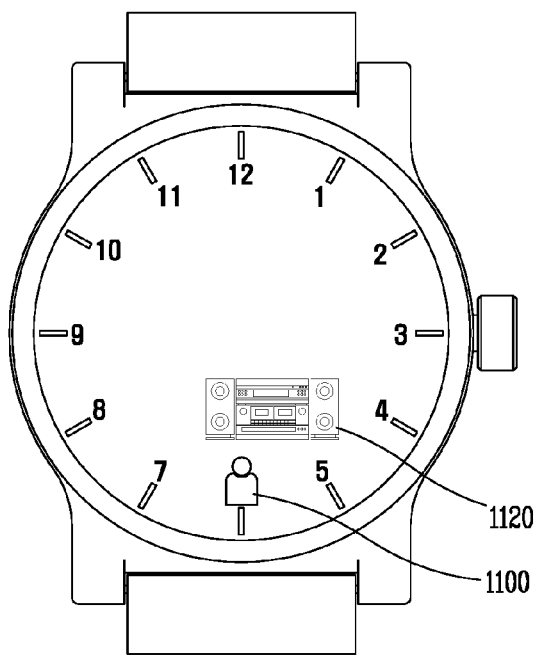
Figure 11C:
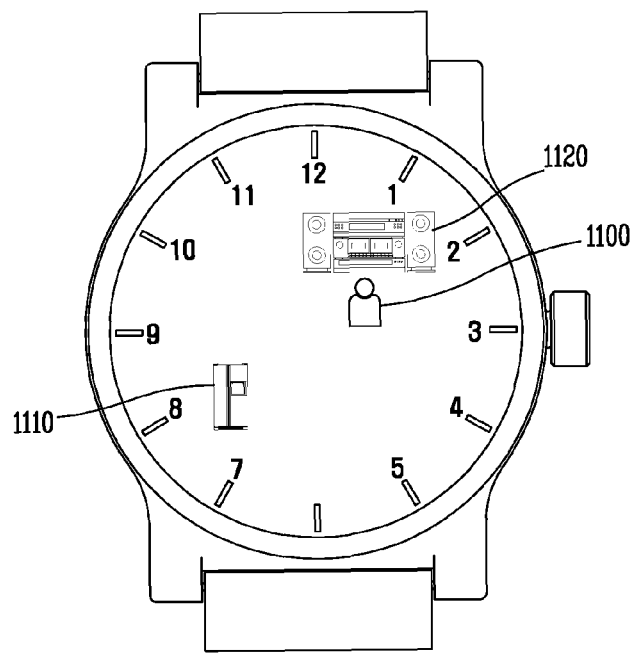
Figure 11D:
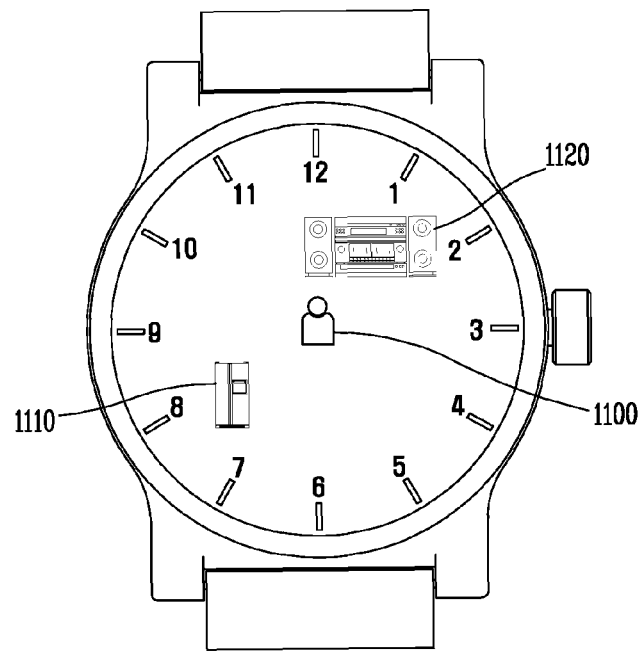

In one embodiment, referring to FIG. 11B, an icon 1100 corresponding to the user of the watch type mobile terminal 300 is displayed as it is at a lower end of the display 351. Furthermore, as the watch type mobile terminal 300 is located in proximity to the smart audio 410-2, an icon 1120 corresponding to the smart audio 410-2 may be moved and displayed at a lower end on which the icon 1100 corresponding to the user of the watch type mobile terminal 300 is displayed.

Here, when a distance between the smart refrigerator 410-1 and the watch type mobile terminal 300 is out of a predetermined range due to the movement of the watch type mobile terminal 300, the icon 1110 corresponding to the smart refrigerator 410-1 disappears from the display 351. In another embodiment, referring to FIG. 11C, an icon 1110 corresponding to the smart refrigerator 410-1 and an icon 1120 corresponding to the smart audio 410-2 may be fixed, and an icon 1100 corresponding to a user of the watch type mobile terminal 300 may be moved and displayed at a side at which the icon 1120 corresponding to the smart audio 410-2 is displayed.

At this time, as the watch type mobile terminal 300 is located in proximity to the smart audio 410-2, the size of the icon 1120 corresponding to the smart audio 410-2 is increased and the size of the icon 1110 corresponding to the smart refrigerator 410-1 is decreased. In still another embodiment, referring to FIG. 11D, the icon 1100 corresponding to the user of the watch type mobile terminal 300 may be moved and displayed at the center of the display 351.

Furthermore, as the watch type mobile terminal 300 is located in proximity to the smart audio 410-2, the icon 1120 corresponding to the smart audio 410-2 may be moved and displayed at the center on which the icon 1100 corresponding to the user of the watch type mobile terminal 300 is displayed. In addition, the icon 1110 corresponding to the smart refrigerator 410-1 may move and displayed in a changing direction corresponding to the movement of the watch type mobile terminal 300. In other words, it is displayed in a direction set based on the center of the display 351 on which the icon 1100 corresponding to the user of the watch type mobile terminal 300 is displayed.

At this time, as the watch type mobile terminal 300 is located in proximity to the smart audio 410-2, the size of the icon 1120 corresponding to the smart audio 410-2 is increased and the size of the icon 1110 corresponding to the smart refrigerator 410-1 is decreased. Further, as illustrated in FIG. 5, the process S520 may include grouping at least one icon to which a predetermined touch input is applied when the touch input is applied to at least one of the plurality of icons to display them on the display 151 of the terminal 100.

In another embodiment associated therewith, the process S520 may include grouping at least one of the plurality of icons based on at least one of the status information and notification information of the respective external devices to display them on the display 151 of the terminal 100. Here, the process S530 may include producing representative notification information recommended for a user of the terminal 100 based on at least one of the status information and notification information of an external device corresponding to the grouped at least one icon, and displaying the produced representative notification information for each group.

Figure 12:
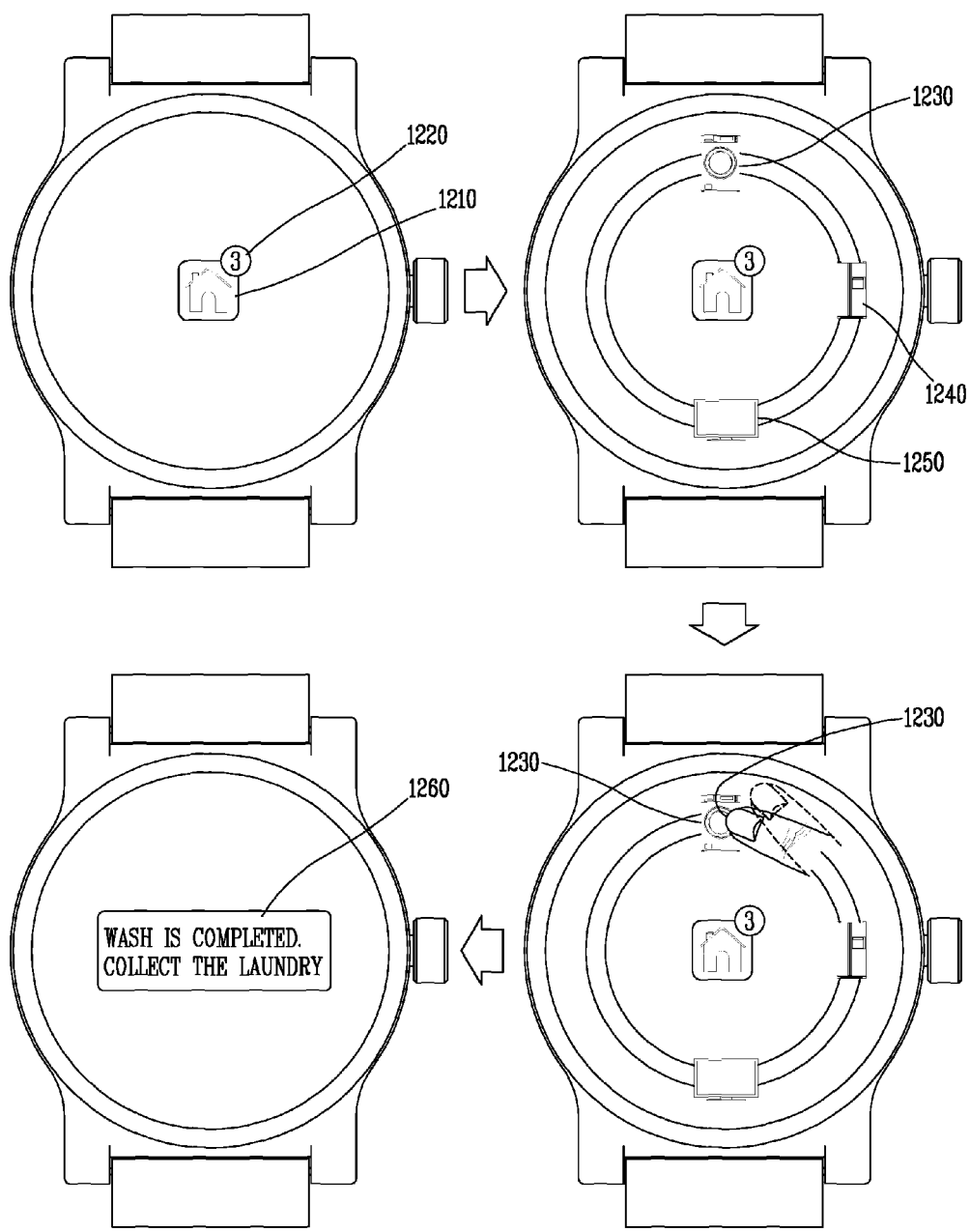
FIG. 12 is a conceptual view illustrating an embodiment in which a location based reminder system according to the present disclosure is implemented as a smart home.

FIG. 12 is a conceptual view illustrating an embodiment in which a location based reminder system according to an embodiment of the present disclosure is implemented as a smart home. Referring to FIG. 12, a user of the watch type mobile terminal 300 comes home or is located within a predetermined distance range from home, a home shaped icon 1210 is displayed. At this time, a number 1220 of status information or notification information produced for smart device existing within home is displayed at the same time.

Subsequently, when the user brings his or her finger in proximity to the display 351, icons 1230, 1240, 1250 corresponding to smart devices existing within home are displayed. In one embodiment, the icons 1230, 1240, 1250 corresponding to the smart devices are displayed in a clockwise direction according to a sequence in which a distance to the watch type mobile terminal 300 is closer.

In another embodiment, when a user applies a drag input in a clockwise or counter-clockwise direction, the icons 1230, 1240, 1250 corresponding to the smart devices may move in a clockwise or counter-clockwise direction. Here, a moving distance may be adjusted according to the extent of the drag input, and an icon corresponding to a smart device that has been displayed disappears and an icon corresponding to another smart device is displayed.

When the user makes a touch on one icon 1230, the notification information 1260 of a smart device corresponding to the relevant icon 1230 is displayed. In one embodiment, when the user makes a touch on the icon 1230 corresponding to a smart washer, the status information of the smart washer indicating that wash has been completed and notification information 1260 for collecting the laundry is displayed.

In another embodiment, notification information indicating laundry collection can be output through a speaker within home other than the terminal 300. Specifically, a voice message for collecting the laundry is output through a speaker disposed on the user's moving path. In other words, the voice message may be sequentially output through a plurality of speakers as the use moves closer thereto.

In still another embodiment, when notification information is displayed on the terminal 300, but an additional input does not exist (when the laundry remains as it is), the controller 180 determines whether or not a preset external terminal or another terminal linked with a user's terminal is in proximity to the smart washer. Accordingly, when the controller 180 determines that the preset external terminal or another terminal linked with a user's terminal is in proximity to the smart washer, the notification information is displayed from the terminals.

Figure 13:
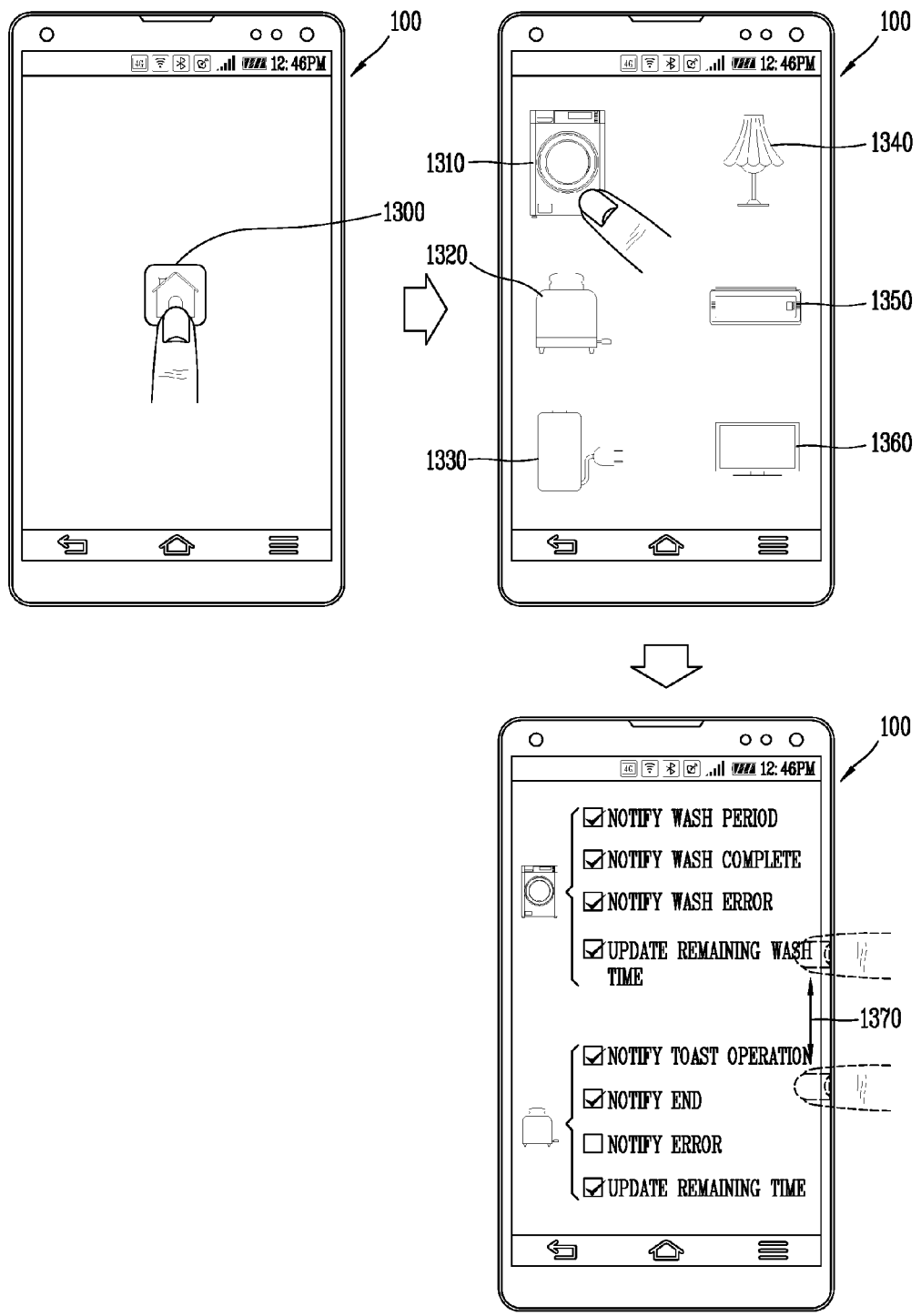
FIG. 13 is a conceptual view illustrating an embodiment in which the notification information of a smart device is set.

FIG. 13 is a conceptual view illustrating an embodiment in which the notification information of a smart device is set. Referring to FIG. 13, when the user of the watch type mobile terminal 300 comes home or is located within a predetermined distance range from home, a home shaped icon 1300 is displayed. Subsequently, when the user applies a long touch input to the home shaped icon 1300, icons 1310, 1320, 1330, 1340, 1350, 1360 corresponding to smart devices capable of selecting the type of notification information are displayed.

Next, when the user applies a touch input to one icon 1310, a list for notification information setting of a smart device corresponding to the icon 1310 to which the touch input is applied is displayed. Specifically, when the user applies a touch input to the icon 1310 corresponding to a smart washer, a list for notification information setting of a smart washer is displayed. For example, the list for notification information setting of a smart washer may include wash period remind, wash complete notification, wash error notification, remaining wash time update, and the like. At this time, the user may apply a touch input to a check box for each item to select whether or not to transmit notification.

In another embodiment, as the user applies a flicking input 1370 in a vertical direction, a list for notification information setting of another smart device is displayed. For example, the list for notification information setting of a toaster may include an toaster operation remind, end notification, error notification, remaining time update, and the like. At this time, the user may apply a touch input to a check box for each item to select whether or not to transmit notification.

Figure 14:
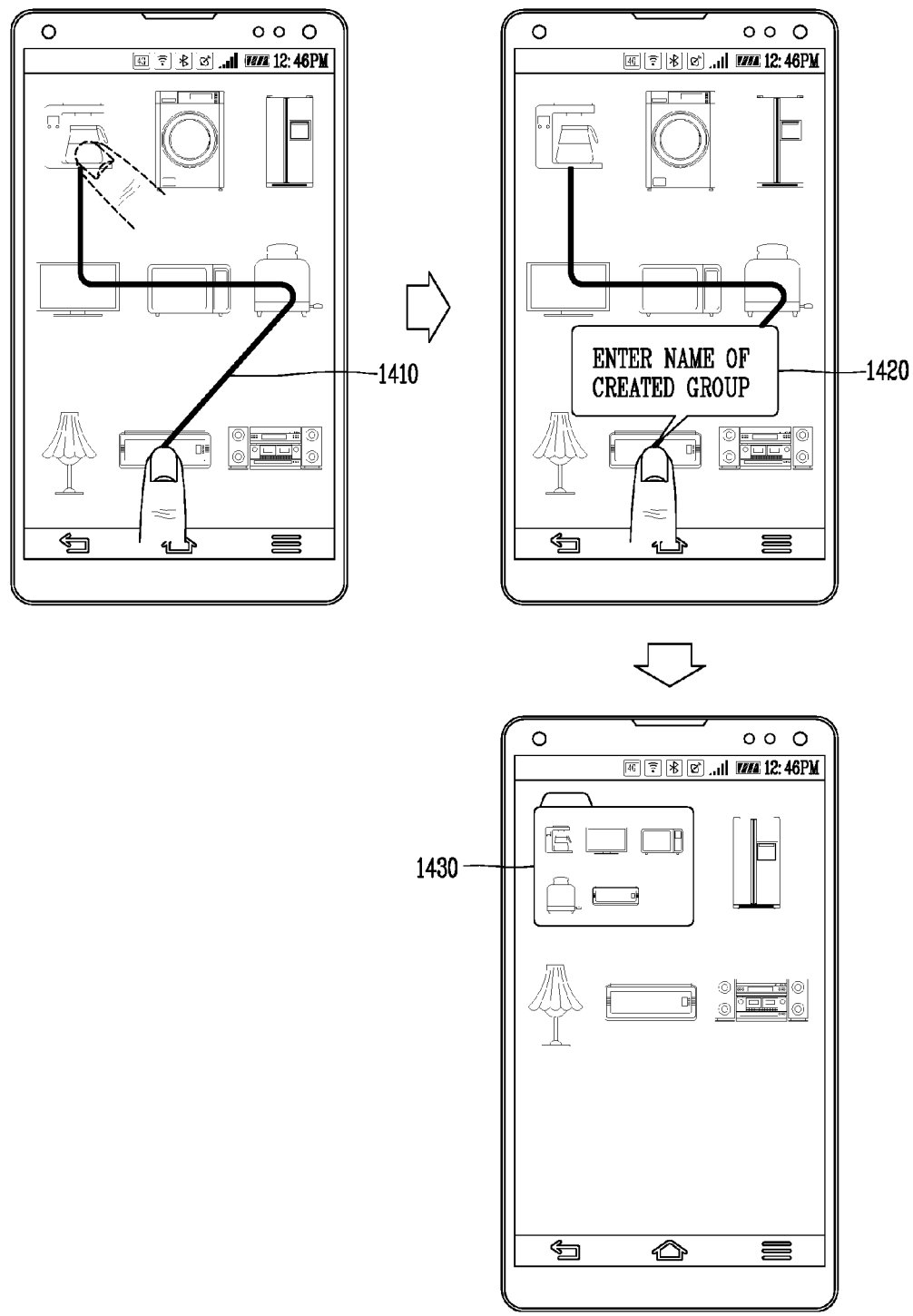
FIG. 14 is a conceptual view illustrating an embodiment in which a group icon including a plurality of smart devices is set.

FIG. 14 is a conceptual view illustrating an embodiment in which a group icon including a plurality of smart devices is set. Referring to FIG. 14, when icons corresponding to smart devices are displayed as illustrated in FIG. 13, a drag input 1410 for selecting any icons may be applied. For example, any icons touched by the drag input 1410 may be selected.

Subsequently, a message window 1420 for entering a group name to be generated is displayed. Accordingly, the user can specify a name of group with his or her voice or directly enter and specify a group name. When a group name is specified in such a manner, the any icons can be bundled and displayed as one group icon 1430. At this time, any icons within the group can be sequentially displayed according to a distance to the user terminal 100. For example, an icon corresponding to a closer smart device may be preferentially displayed. Otherwise, it is displayed in a larger size than that of the other icons.

Figure 15A:
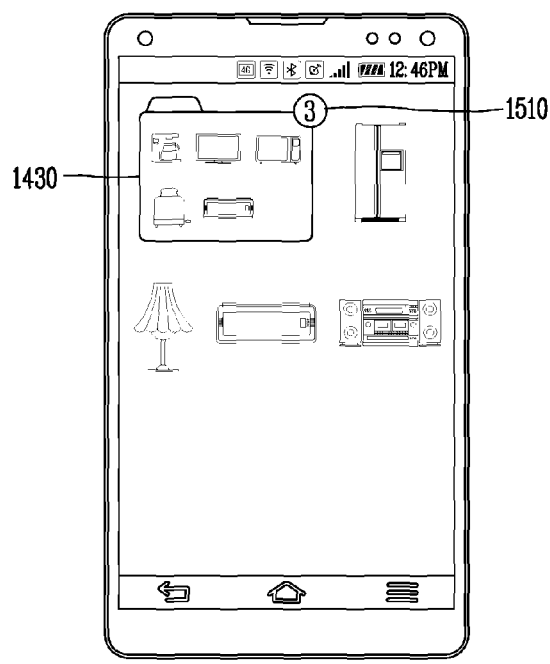
FIGS. 15A and 15B are conceptual views illustrating an embodiment in which notification information is displayed on a group icon.
Figure 15B:
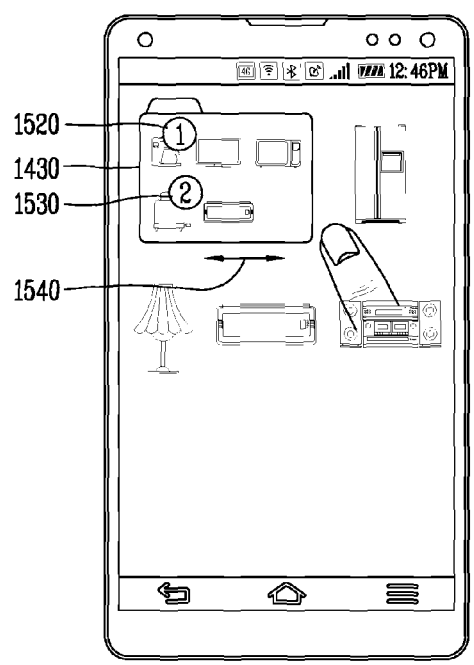

FIGS. 15A and 15B are conceptual views illustrating an embodiment in which notification information is displayed on a group icon. Referring to FIG. 15A, when notification information is produced for a smart device corresponding to an icon included in the group icon 1430, a number 1510 of the produced notification information is displayed on the group icon 1430. Referring to FIG. 15B, when notification information is produced for a plurality of smart devices corresponding to icons included in the group icon 1430, a number 1520, 1530 of the produced notification information is displayed on icons corresponding to the plurality of smart devices, respectively.

In one embodiment, when one notification information is produced for a smart coffee machine and two notification information are produced for a smart toaster, a number of the produced notification information is displayed on an icon corresponding to the respective smart devices. In another embodiment, an icon corresponding to a smart device for which notification information has been produced may be preferentially displayed. In other words, icons may be rearranged according to a sequence in which notification information exists.

In still another embodiment, a user may apply a horizontal drag (scroll) input 1540 to the group icon 1430 to change the location of icons displayed within the group icon 1430. Specifically, the icons may rotate in a clockwise direction when a drag input is applied in the left direction, and the icons rotate in a counter-clockwise direction when a drag input is applied in the right direction.

Figure 16A:
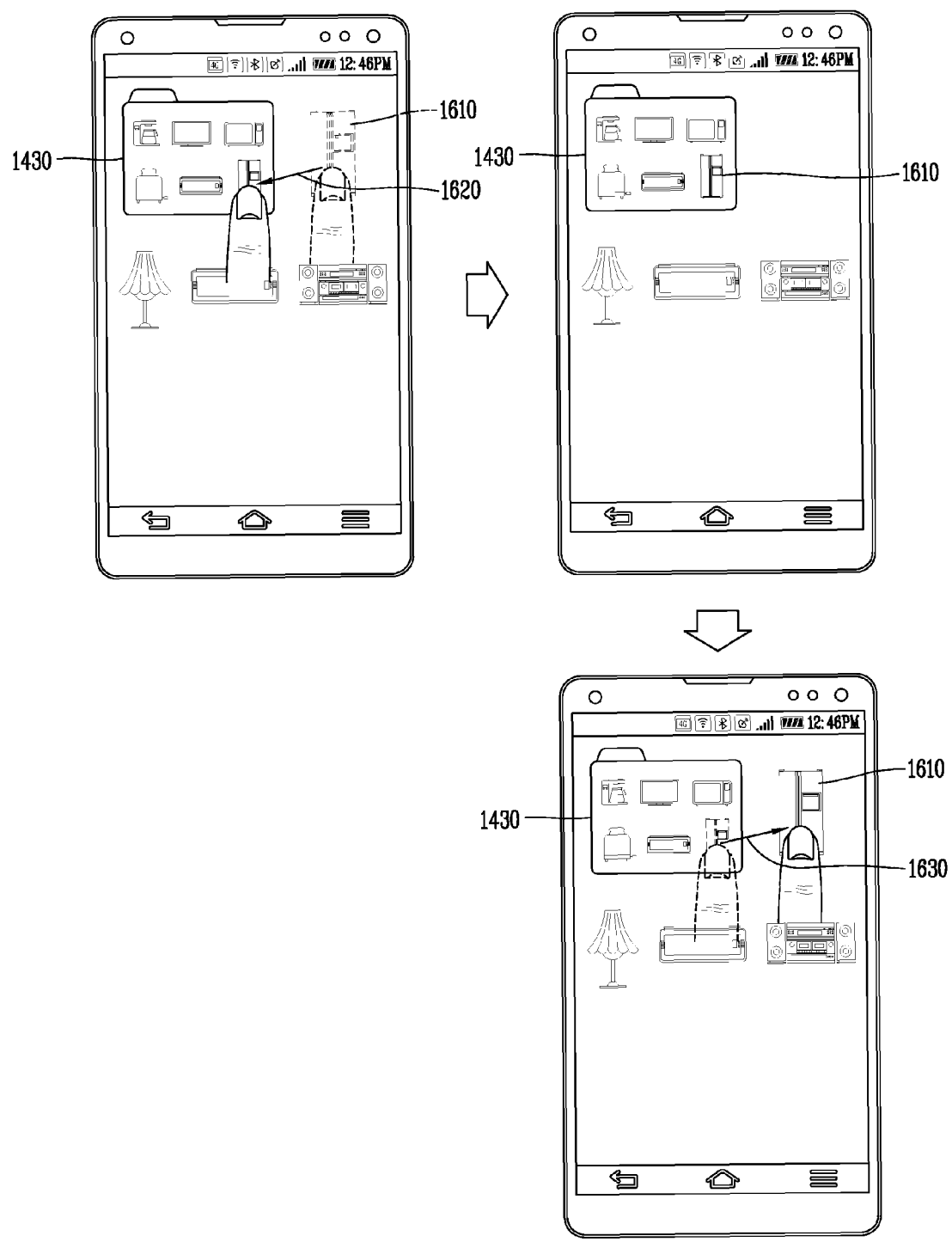
FIGS. 16A and 16B are conceptual views illustrating an embodiment in which a group icon is edited.
Figure 16B:
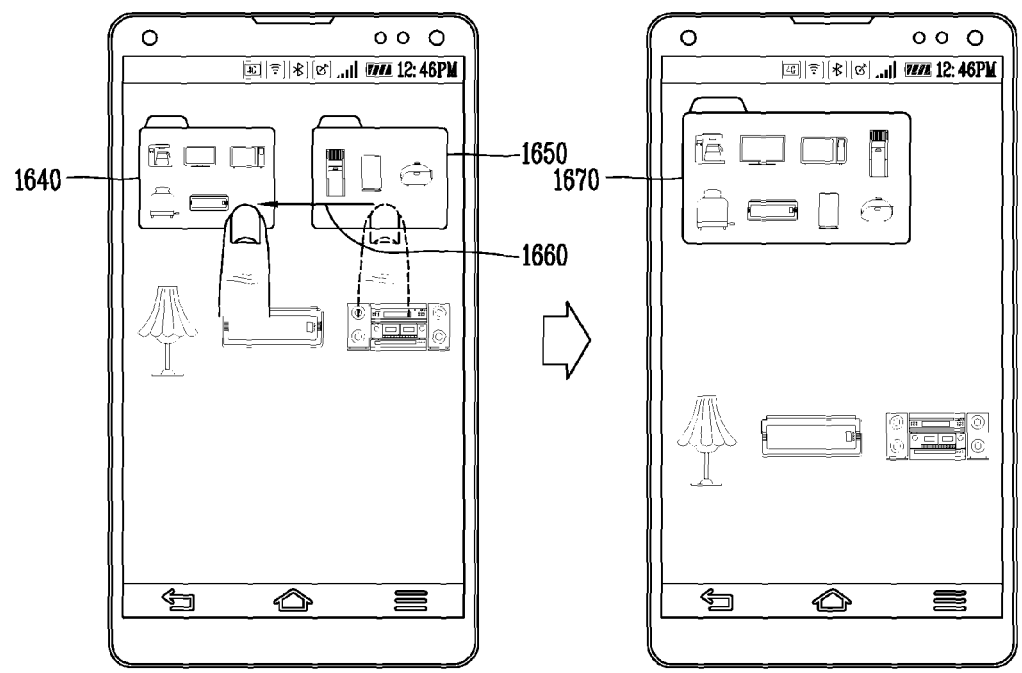

FIGS. 16A and 16B are conceptual views illustrating an embodiment in which a group icon is edited. Referring to FIG. 16A, when an input 1620 for dragging the icon 1610 corresponding to a smart refrigerator is applied in an inward direction of the group icon 1430, the icon 1610 of the smart refrigerator may be included in the group icon 1430.

Subsequently, when an input 1630 for dragging the icon 1610 corresponding to a smart refrigerator is applied in an outward direction of the group icon 1430, the icon 1610 of the smart refrigerator is displayed again out of the group icon 1430. Referring to FIG. 16B, when an input 1660 for dragging a second group icon 1650 into a first group icon 1640 is applied, a third group icon 1670 including all smart devices that have been included in the first group icon 1640 and second group icon 1650, respectively, may be generated.

Figure 17A:
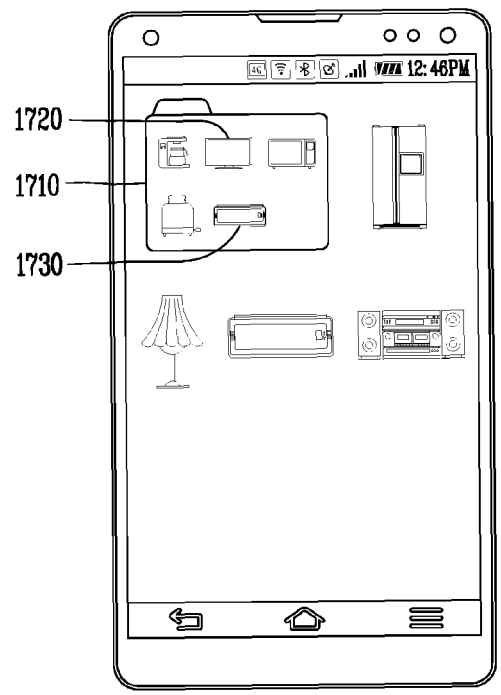
FIGS. 17A and 17B are conceptual views illustrating another embodiment in which the display of icons corresponding to a plurality of smart devices is changed according to the movement of a terminal.
Figure 17B:
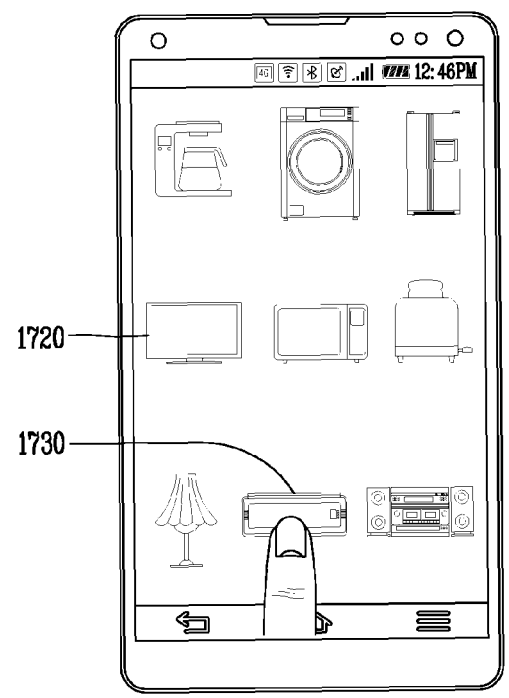

FIGS. 17A and 17B are conceptual views illustrating another embodiment in which the display of icons corresponding to a plurality of smart devices is changed according to the movement of a terminal. Referring to FIGS. 17A and 17B, when smart devices corresponding to some icons being displayed are located out of a predetermined distance range due to the movement of the terminal 100, the brightness, size, location or the like of the some icons may vary.

In one embodiment, smart devices corresponding to some icons 1720, 1730 that have been displayed within a group icon 1710 are located out of a predetermined distance range, the some icons 1720, 1730 are displayed in a dim manner. In another embodiment, when the some icons 1720, 1730 have been displayed at a front side within the group icon 1710, they may be moved and displayed at a rear side within the group icon 1710.

Similarly, the some icons 1720, 1730 among an icon list of smart devices that has been located and displayed within a predetermined distance range are displayed in a dim manner. In other words, when it is difficult to communicate with the terminal 100 since the smart device is located out of the predetermined distance range, the status of an icon that has been displayed will be changed.

Figure 18A:
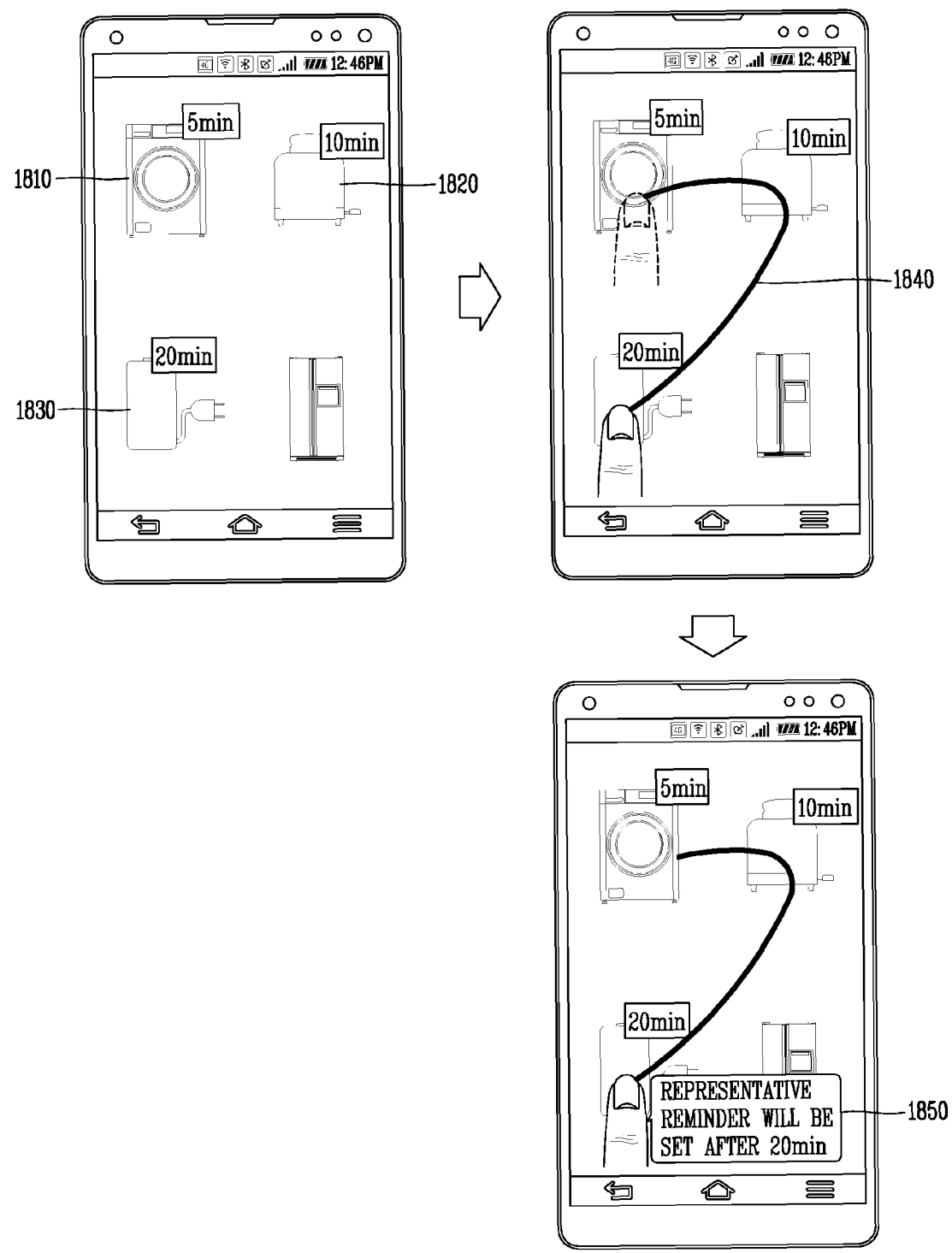
FIGS. 18A and 18B are conceptual views illustrating an embodiment in which a representative notification information is set.
Figure 18B:
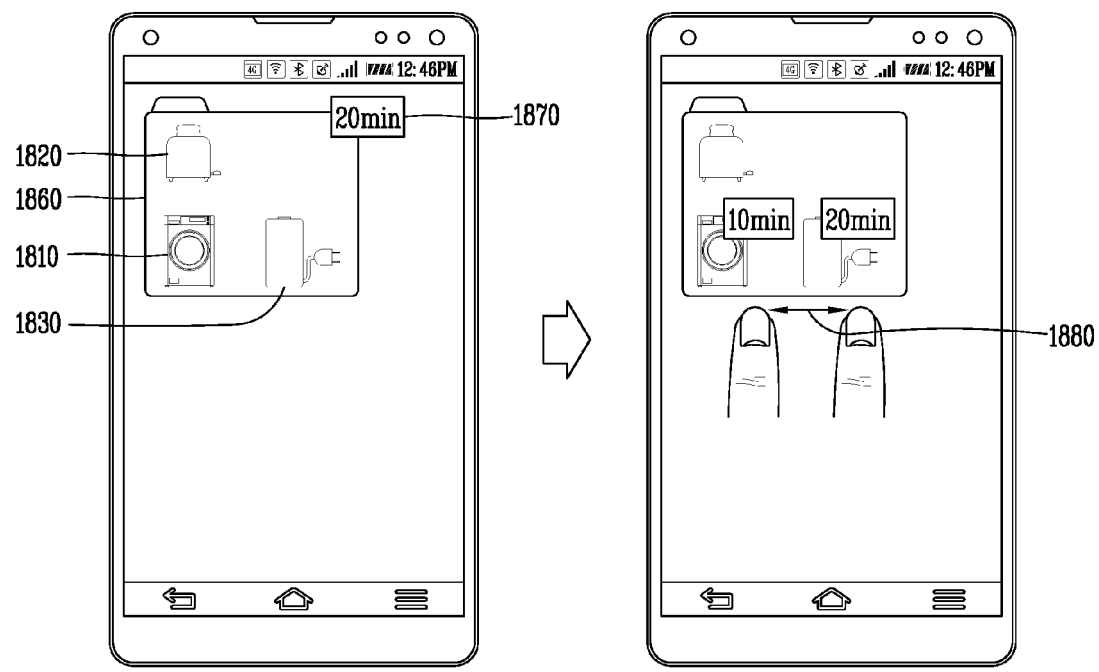

FIGS. 18A and 18B are conceptual views illustrating an embodiment in which a representative notification information is set. Referring to FIG. 18A, icons 1810, 1820, 1830 corresponding to a smart washer, a smart toaster, and a smart charger, respectively, are displayed. At this time, an operation complete time may be continuously updated and displayed on the respective icons 1810, 1820, 1830.

For example, a remaining time of 5 minutes until wash complete when the smart washer, a remaining time of 10 minutes until cooking complete in case of the smart toaster, and a remaining time of 20 minutes until charge complete in case of the smart charger is displayed on the respective icons 1810, 1820, 1830. Subsequently, when a drag input for connecting the respective icons 1810, 1820, 1830 is applied, a message window 1850 indicating that a representative alarm has been set is displayed. For example, one representative alarm (only representative notification information) is displayed after 20 minutes for a group including the smart washer, smart toaster, and smart charger.

Referring to FIG. 18B, a group icon 1860 including icons 1810, 1820, 1830 corresponding to a smart washer, a smart toaster, and a smart charger, respectively, is displayed. At this time, a message 1870 of a representative alarm setting that has been set in FIG. 18A is displayed. Subsequently, when a scroll (drag) input 1880 is applied in a left or right direction to the group icon 1860, the icons 1810, 1820, 1830 may move in a clockwise or counter-clockwise direction.

In one embodiment, an expected time of completion for smart devices corresponding to the respective icons 1810, 1820, 1830 is displayed on the respective icons 1810, 1820, 1830. Further, as illustrated in FIG. 6, the process S630 may include producing notification information recommended for a user of the terminal 100 based on the schedule information of the user stored in the terminal 100.

Figure 19:
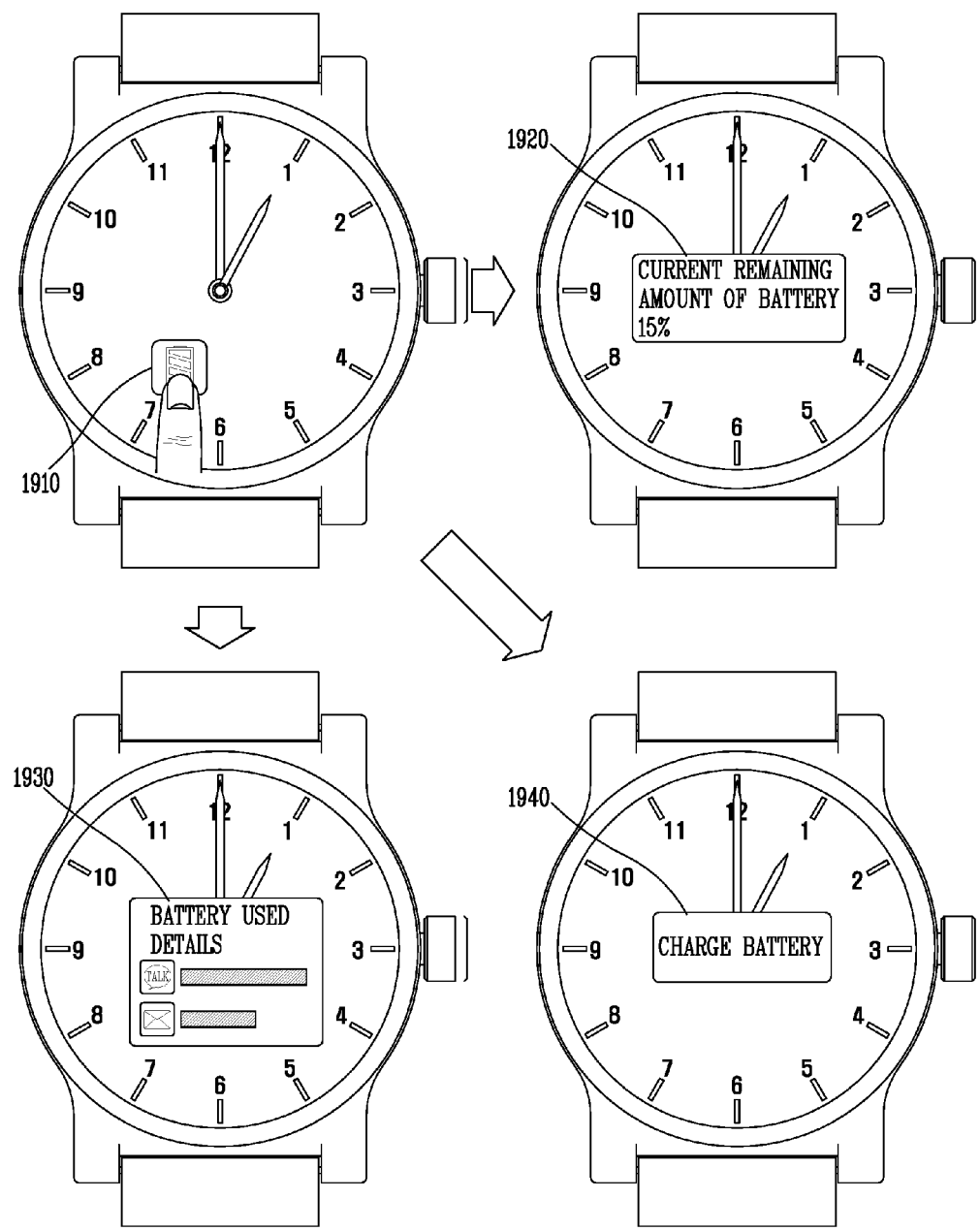
FIG. 19 is a conceptual view illustrating in which the status information/notification information of a terminal is displayed.

FIG. 19 is a conceptual view illustrating in which the status information/notification information of a terminal is displayed. Referring to FIG. 19, when the controller 180 determines that the watch type mobile terminal 300 is located within a predetermined distance range from a smart charger by the beacon 420, an icon 1910 corresponding to the smart charger is displayed on the display 351.

At this time, the status information of the watch type mobile terminal 300 may be output as a sound notification along with the icon 1910. For example, a voice message indicating a remaining amount of battery of the terminal 300 is displayed. Subsequently, when a touch input is applied to the icon 1910 of the smart charger, a message window 1920 including the status information of the smart charger is displayed. For example, the message window 1920 indicating a current remaining amount of battery of the watch type mobile terminal 300 is displayed. Otherwise, a message window 1930 indicating the battery use details of the watch type mobile terminal 300 is displayed.

In another embodiment, when a touch input is applied to the icon 1910 of the smart charger, a message window 1940 including notification information produced through the status information of the smart charger is displayed. For example, the message window 1940 for charging a battery of the watch type mobile terminal 300 is displayed. At this time, a voice message or vibration notification for charging the battery may be output at the same time.

In still another embodiment, when the controller 180 determines that the watch type mobile terminal 300 is located within a predetermined distance range from the smart charger while the process of displaying and selecting the icon 1910 (touch input) is omitted, the message window 1920, 1930, 1940 may be immediately displayed.

In yet still another embodiment, when the watch type mobile terminal 300 is located in proximity to the smart charger, the status information of the watch type mobile terminal 300 is displayed and then notification information produced based on the status information is displayed. Otherwise, the status information and notification information is displayed at the same time, and only the notification information is displayed.

The type (form) of information displayed as described above may be determined by a user's touch input mode. For example, notification information is displayed when a long touch input is applied to the icon 1910 of the smart charger, and status information is displayed when a short touch input is applied thereto.

Figure 20A:
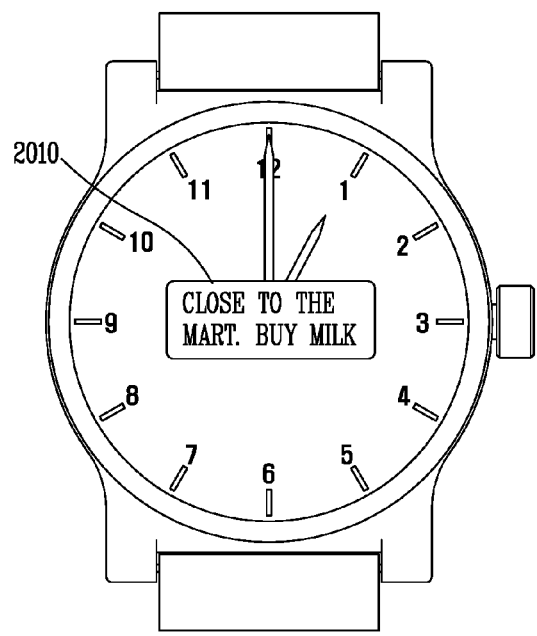
FIGS. 20A and 20B are conceptual views illustrating an embodiment in which notification information is displayed based on the schedule information of the user.
Figure 20B:
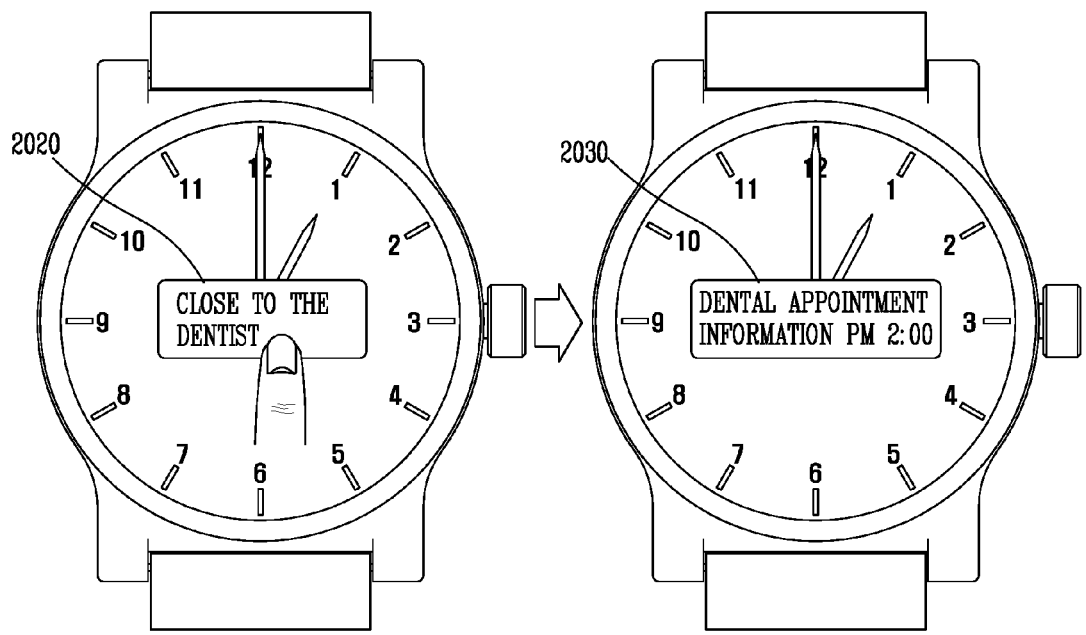

FIGS. 20A and 20B are conceptual views illustrating an embodiment in which notification information is displayed based on the schedule information of the user. Referring to FIG. 20A, information indicating that there is no milk in the smart refrigerator may be transmitted to the terminal 300. Furthermore, a user passing by a mart at a specific time may be produced through the schedule information of the user. Accordingly, the location of the terminal 300 at a specific time may be checked to check whether or not he or she is in proximity to the mart, and then display a message window 2010 for purchasing milk due to his or her location in proximity to the mart.

Referring to FIG. 20B, when a dental appointment is stored in the schedule information of the user, the location of the terminal 300 may be checked at an appointment time, and then a message window 2020 indicating that he or she is in proximity to the dentist's office is displayed. Subsequently, when the user makes a touch on the message window 2020, a message window 2030 including dentist appointment information is displayed.

In another embodiment, when a dental visit is stored in a user's To-Do List, and when the user passes by the dentist's office, notification information indicating it is displayed. Accordingly, when the user can touch the notification information, a list of dentist's offices adjacent to a current location, information on the relevant dentist's office or the like is displayed. Thus, the terminal watch type mobile terminal 300 can extract an associated word related to a location or electronic product or the like from schedule information stored therein, a To-Do List, and the like. The effects of a location based reminder system according to an embodiment of the present disclosure and a control method thereof will be described as follows.

Thus, the embodiments of the present disclosure are advantageous by recommending an operation that should be performed by a user of the terminal when a distance between a terminal and a smart device is closer. Furthermore, an alarm is output in consideration of a user's current situation contrary to the related art in which alarm information is output in response to a time. In other words, an alarm is output when a user can immediately take an action according to the user's location, contrary to the related art in which an alarm is sounded once at a specific time. As a result, it may be possible to enhance the user's convenience.

The foregoing present invention may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the mobile terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A method of controlling a mobile terminal, the method comprising:
receiving operational status information of an external device, via a wireless communication unit of the mobile terminal, from the external device in response to the mobile terminal being located within a predetermined distance range from the external device;
displaying an icon on a display of the mobile terminal representing a type of the external device;
displaying the operational status information of the external device and recommended user notification information for performing a recommended operation on the external device in response to a selection of the displayed icon,
wherein the recommended user notification information is produced based on at least one of the operational status information of the external device or a status information of the mobile terminal associated with the external device;
receiving a predetermined information from the external device;
calculating a position of the mobile terminal expected at a specific time based on a schedule information stored in the mobile terminal; and
displaying a recommended user notification related to the predetermined information, according to the position of the mobile terminal at the specific time.

2. The method of claim 1, further comprising:
determining whether or not the mobile terminal is located within the predetermined distance range based on a strength of a radio signal received from the external device.

3. The method of claim 1, wherein the recommended user notification information is produced by the mobile terminal based on the operational status information of the external device.

4. The method of claim 1, wherein the recommend user notification information is produced based on a distance between the mobile terminal and the external device along with the operational status information.

5. The method of claim 1, wherein the external device includes a plurality of external devices.

6. The method of claim 5, further comprising:
receiving, via the wireless communication unit, status information from the plurality of external devices in response the mobile terminal being located within the predetermined distance range from the plurality of external devices.

7. The method of claim 6, further comprising:
displaying a plurality of icons on the display representing types of the plurality of external devices, respectively; and
displaying the operational status information of a corresponding external device and recommended user notification information for performing a recommended operation on the corresponding external device on the display in response to a selection of a displayed icon of the corresponding external device.

8. The method of claim 7, further comprising:
displaying a plurality of transmission status icons on the display next to the plurality of icons representing a transmission connection status between the mobile terminal and corresponding external devices.

9. The method of claim 8, wherein the plurality of icons are dynamically displayed a positions on the display to represent distances between the mobile terminal and the corresponding external devices.

10. The method of claim 1, wherein the mobile terminal is a smart watch.

11. The method of claim 1, wherein the external device comprises a home appliance.

12. The method of claim 11, further comprising:
displaying a home icon on the display in response to the mobile terminal being within a predetermined distance from a home corresponding to a user of the mobile terminal;
displaying icons representing a plurality of appliance external devices in the home in response to a selection of the displayed home icon;
selecting operational status items for each appliance external device; and
displaying the operational status information corresponding to the selected operational status items for each appliance external device.

13. The method of claim 1, further comprising:
displaying a plurality of icons representing home appliance external devices within a predetermined distance of the mobile terminal;
receiving a touch input touching at least two icons; and
displaying a group icon including the at least two icons, in response to the received touch input.

14. The method of claim 13, further comprising:
displaying representative notification information on the group icon indicating the operational status information and recommended user notification information for external appliance devices represented by the at least two icons.

15. A mobile terminal, comprising:
a display;
a wireless communication unit configured to receive operational status information of an external device from the external device in response to the mobile terminal being located within a predetermined distance range from the external device; and
a controller configured to:
display an icon on the display representing a type of the external device,
display the operational status information of the external device and recommended user notification information for performing a recommended operation on the external device on the display in response to a selection of the displayed icon,
wherein the recommended user notification information is produced based on at least one of the operational status information of the external device or a status information of the mobile terminal associated with the external device,
receive a predetermined information from the external device,
calculate a position of the mobile terminal expected at a specific time based on a schedule information stored in the mobile terminal, and
display a recommended user notification related to the predetermined information, according to the position of the mobile terminal at the specific time.

16. The mobile terminal of claim 15, wherein the controller is further configured to:
determine whether or not the mobile terminal is located within the predetermined distance range based on a strength of a radio signal received from the external device.

17. The mobile terminal of claim 15, wherein the recommended user notification information is produced by the mobile terminal based on the operational status information of the external device.

18. The mobile terminal of claim 15, wherein the recommend user notification information is produced based on a distance between the mobile terminal and the external device along with the operational status information.

19. The mobile terminal of claim 15, wherein the external device includes a plurality of external devices.

20. The mobile terminal of claim 19, wherein the controller is further configured to:
receive, via the wireless communication unit, status information from the plurality of external devices in response the mobile terminal being located within the predetermined distance range with from the plurality of external devices.

* * * * *